United States Patent
Xie et al.

(10) Patent No.: US 11,018,724 B2
(45) Date of Patent: May 25, 2021

(54) METHOD AND APPARATUS FOR EMULATING MULTIPLE CARDS IN MOBILE DEVICES

(71) Applicant: RFCyber Corporation, Fremont, CA (US)

(72) Inventors: Xiangzhen Xie, Shenzhen (CN); Liang Seng Koh, Fremont, CA (US); Hsin Pan, Fremont, CA (US)

(73) Assignee: RFCyber Corp., Plano, TX (US)

( * ) Notice: Subject to any disclaimer, the term of this patent is extended or adjusted under 35 U.S.C. 154(b) by 1699 days.

(21) Appl. No.: 13/782,948

(22) Filed: Mar. 1, 2013

(65) Prior Publication Data

US 2013/0178159 A1 Jul. 11, 2013

Related U.S. Application Data

(63) Continuation-in-part of application No. 13/350,832, filed on Jan. 16, 2012, now abandoned, which is a
(Continued)

(51) Int. Cl.
*H04B 5/00* (2006.01)
*G06Q 30/06* (2012.01)
(Continued)

(52) U.S. Cl.
CPC ......... *H04B 5/0056* (2013.01); *G06Q 20/227* (2013.01); *G06Q 20/322* (2013.01);
(Continued)

(58) Field of Classification Search
None
See application file for complete search history.

(56) References Cited

U.S. PATENT DOCUMENTS 6,481,632 B2 * 11/2002 Wentker .................. G06F 8/60
235/376
7,206,849 B1 * 4/2007 Gernert ................. G06F 1/3203
370/249
(Continued)

FOREIGN PATENT DOCUMENTS

WO    WO-2009083679 A2 *  7/2009  ........... G06Q 20/351

OTHER PUBLICATIONS

Chameleon—A versatile emulator for contactless smart cards, Kasper Timo et al., Information and security cryptology, 2010, Berlin, Heidelberg, 189-206.*

*Primary Examiner* — Neha Patel
*Assistant Examiner* — Isidora I Immanuel
(74) *Attorney, Agent, or Firm* — Joe Zheng

(57) ABSTRACT

Techniques for mobile devices configured to support or function as multiple contactless cards, such as Mifare contactless cards, are disclosed. According to one embodiment, a mobile device embedded with an emulator is loaded with a plurality of software modules or applications, each emulating one card or one type of contactless cards. An emulator is implemented in a secure element that is personalized for a user of the mobile device while the applications are respectively provisioned via their respective providers per the personalized secure element. When the mobile device is to be used as a contactless card to perform a monetary function, a corresponding application is loaded into and executed in the emulator. When the mobile device is to be used to perform another monetary function, a corresponding application is loaded into the emulator to replace the previous application entirely or partially in the emulator. As a result, the mobile device can be used as a monetary device in lieu of multiple contactless cards.

11 Claims, 35 Drawing Sheets

Offline Mifare application with reader and SAM

Related U.S. Application Data continuation-in-part of application No. 11/534,653, filed on Sep. 24, 2006, now Pat. No. 8,118,218.

(60) Provisional application No. 61/606,451, filed on Mar. 4, 2012.

(51) Int. Cl.
| | |
|---|---|
| *G06Q 20/36* | (2012.01) |
| *G06Q 20/40* | (2012.01) |
| *G06Q 20/32* | (2012.01) |
| *G06Q 20/22* | (2012.01) |
| *G06Q 20/34* | (2012.01) |

(52) U.S. Cl.
CPC ....... *G06Q 20/3278* (2013.01); *G06Q 20/352* (2013.01); *G06Q 20/3552* (2013.01); *G06Q 20/3572* (2013.01); *G06Q 20/3672* (2013.01); *G06Q 20/40* (2013.01); *G06Q 30/0601* (2013.01)

(56) References Cited

U.S. PATENT DOCUMENTS

| | | | | |
|---|---|---|---|---|
| 7,908,216 | B1* | 3/2011 | Davis | G06Q 20/02 705/41 |
| 8,005,426 | B2* | 8/2011 | Huomo | G06Q 20/20 235/441 |
| 8,646,059 | B1* | 2/2014 | von Behren | G06Q 20/3574 726/9 |
| 9,128,829 | B2* | 9/2015 | Corda | G06F 12/0638 |
| 2003/0151125 | A1* | 8/2003 | Hosogoe | G06Q 20/3574 257/679 |
| 2006/0052080 | A1* | 3/2006 | Vitikainen | G10L 15/30 455/403 |
| 2006/0065741 | A1* | 3/2006 | Vayssiere | G06K 19/07703 235/492 |
| 2006/0141987 | A1* | 6/2006 | De Groot | H04L 63/0414 455/411 |

\* cited by examiner

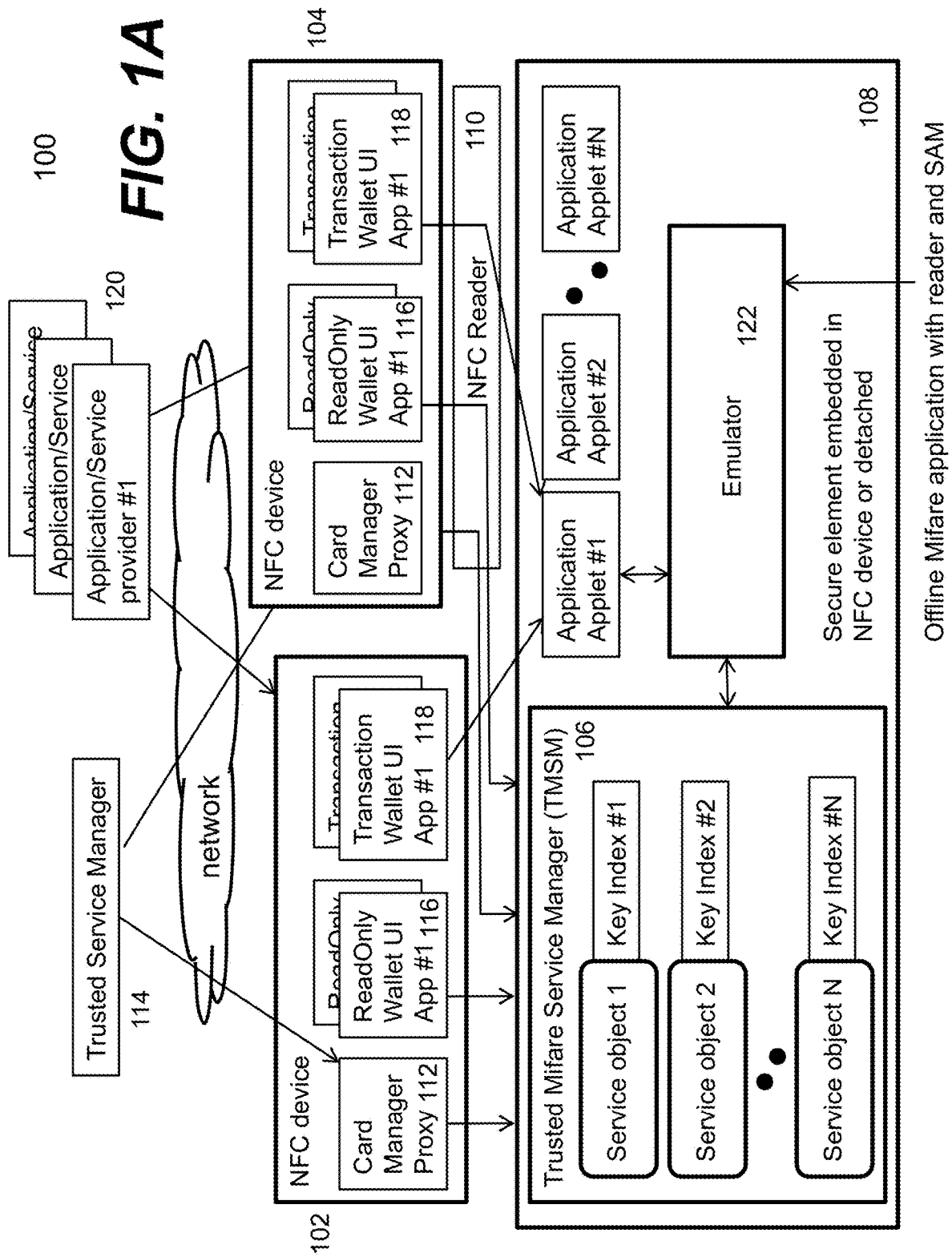

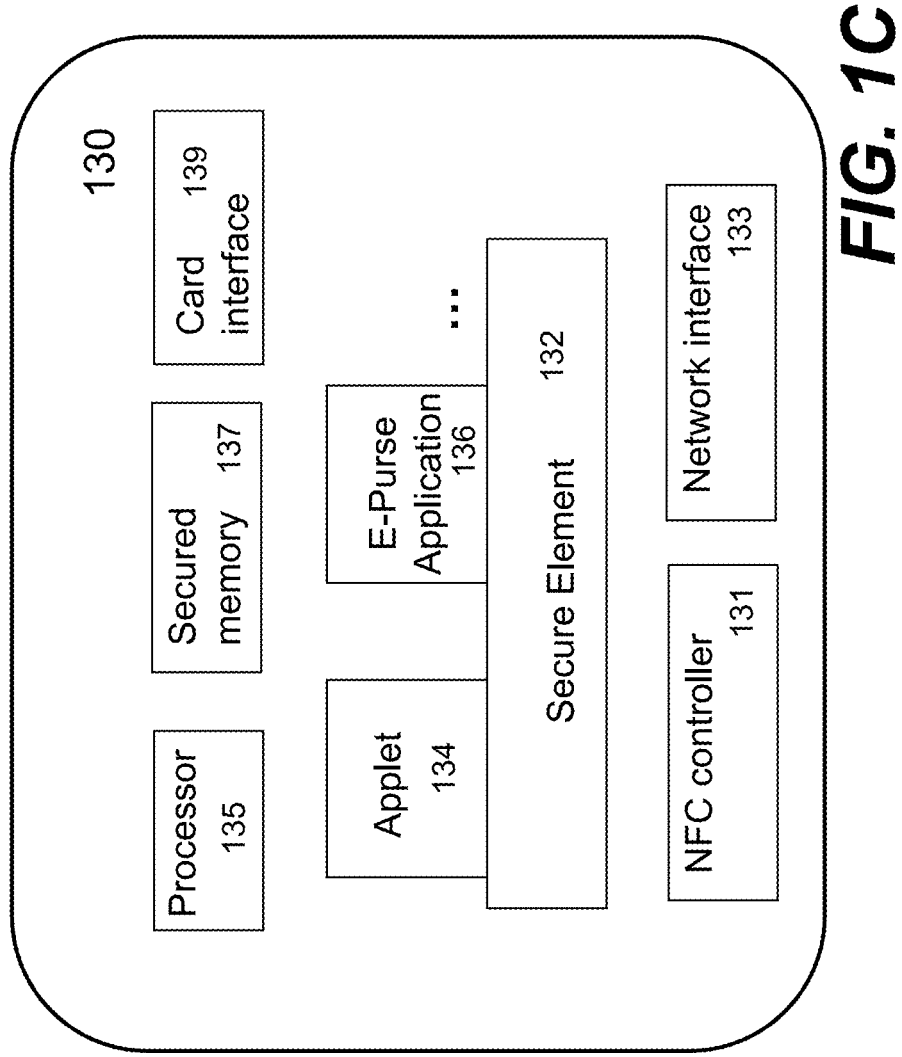

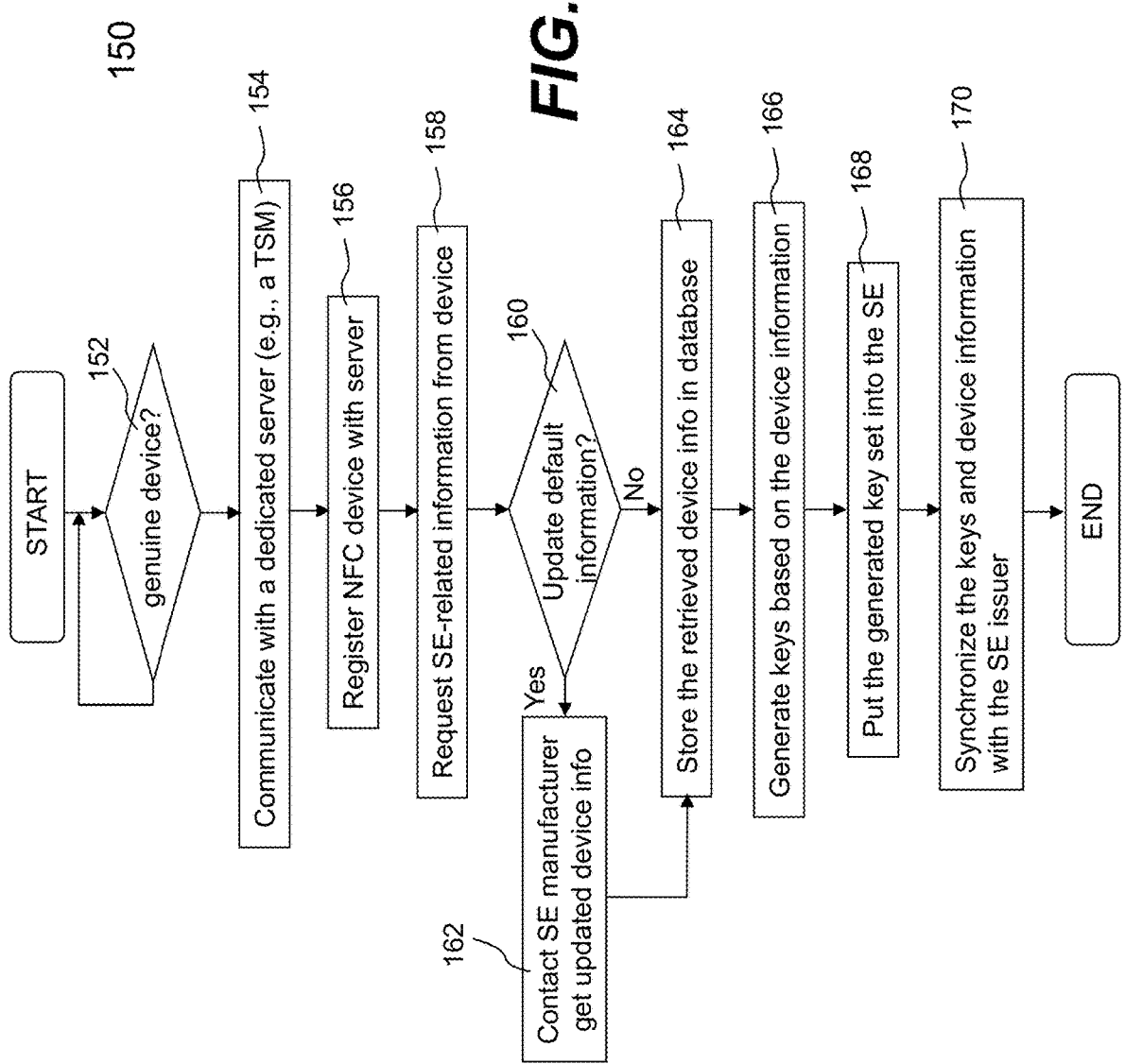

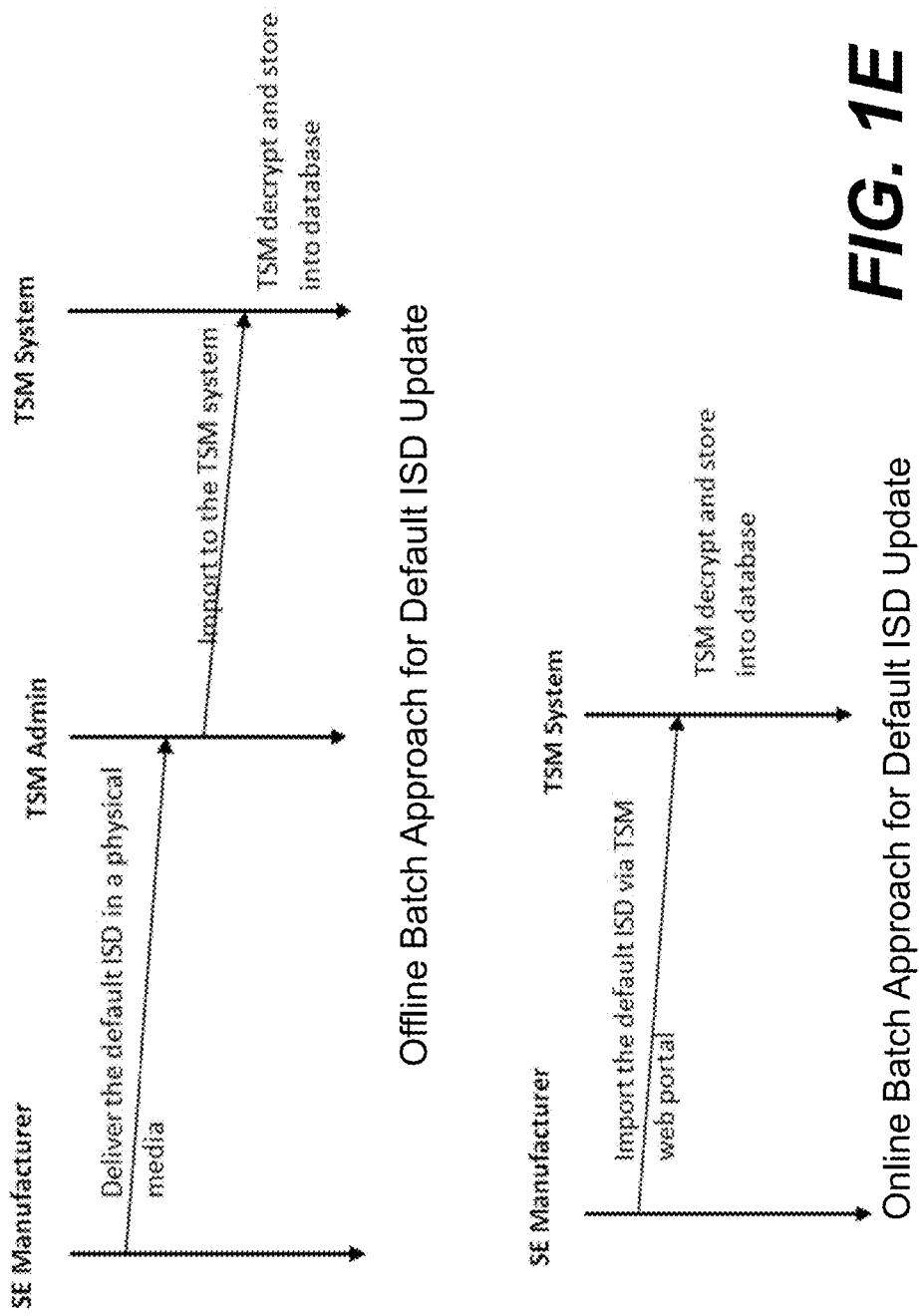

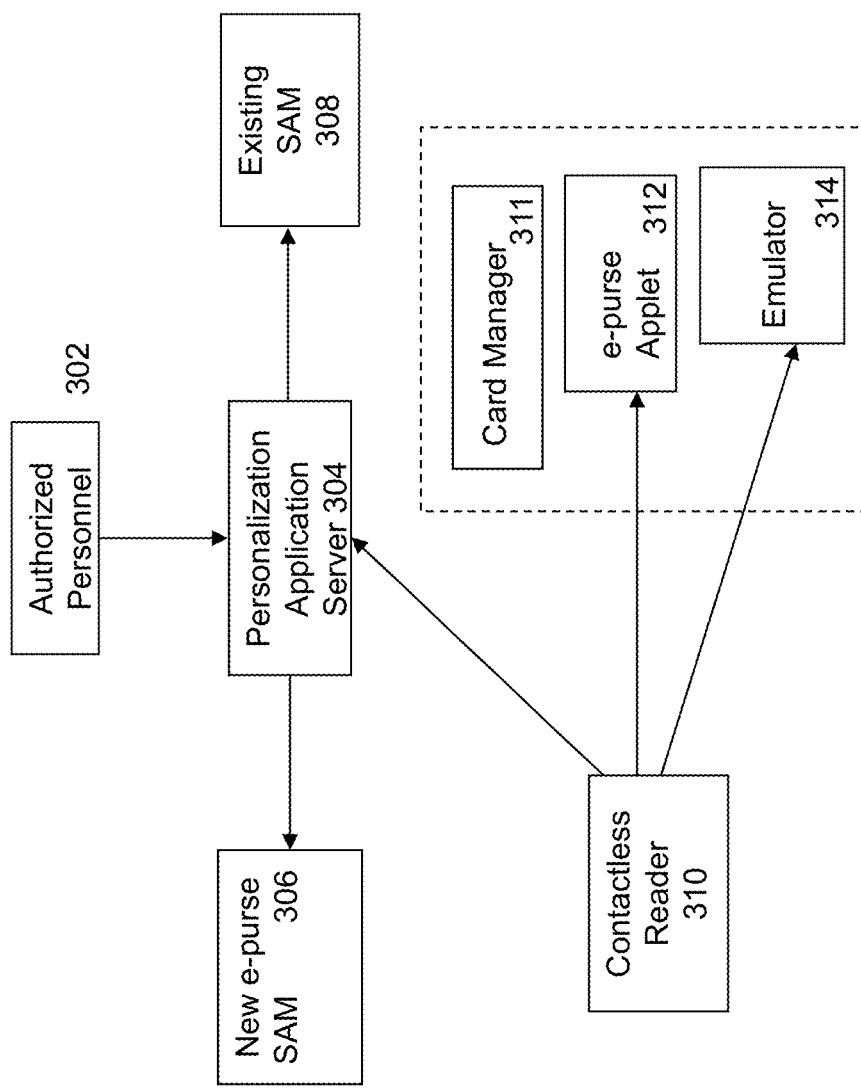

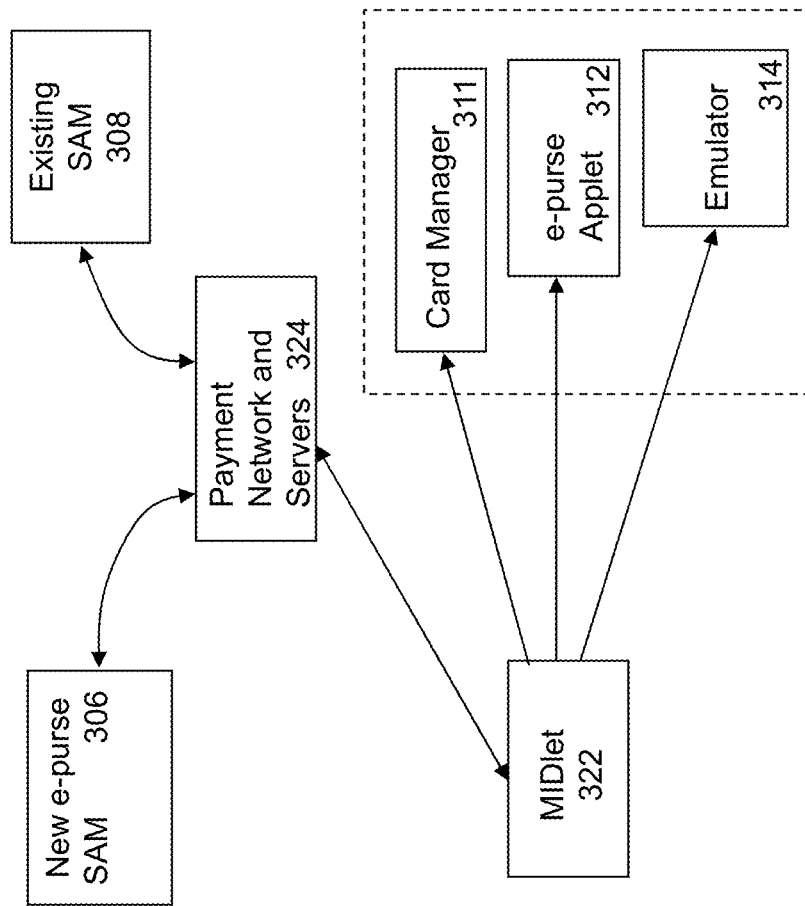

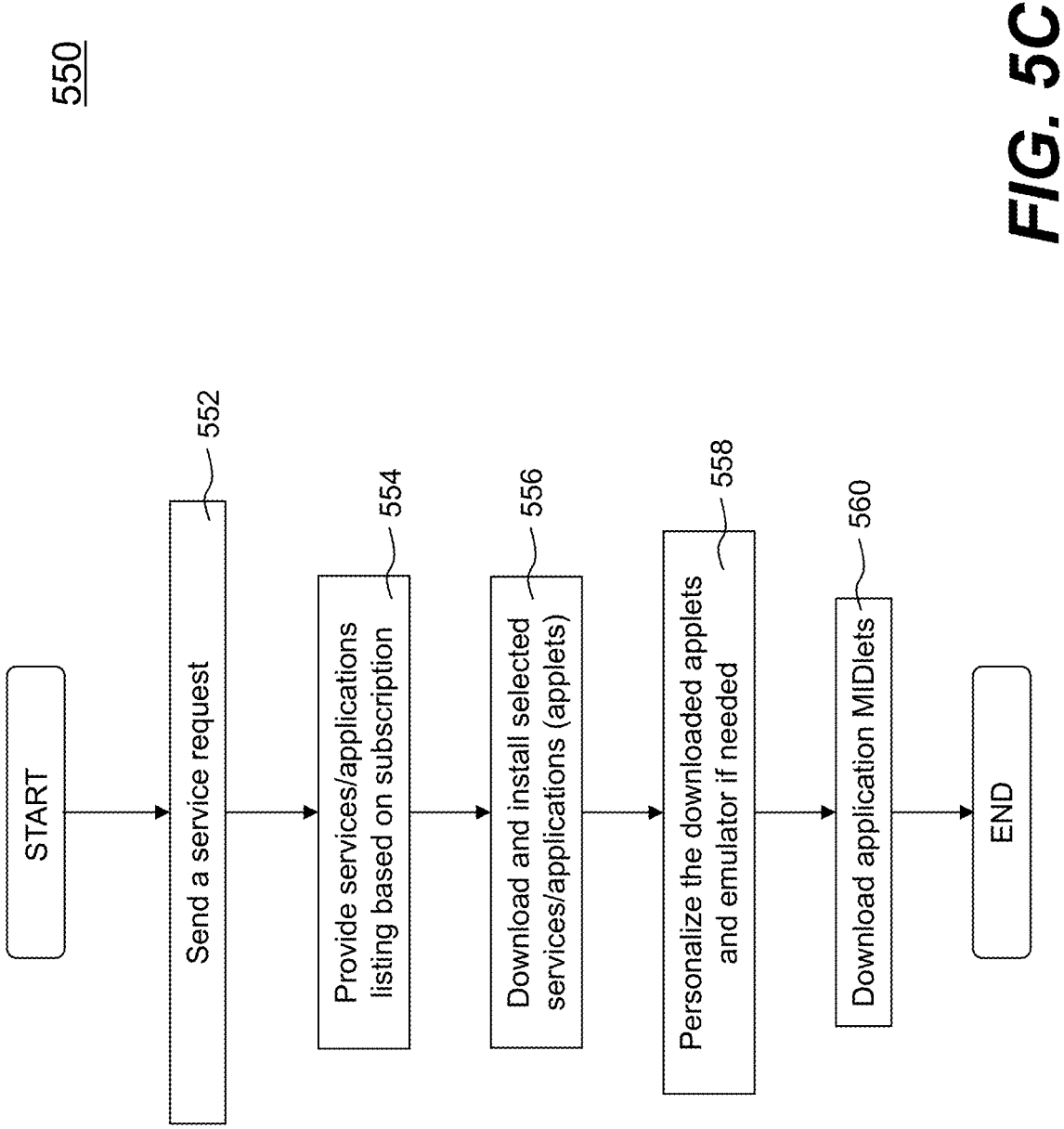

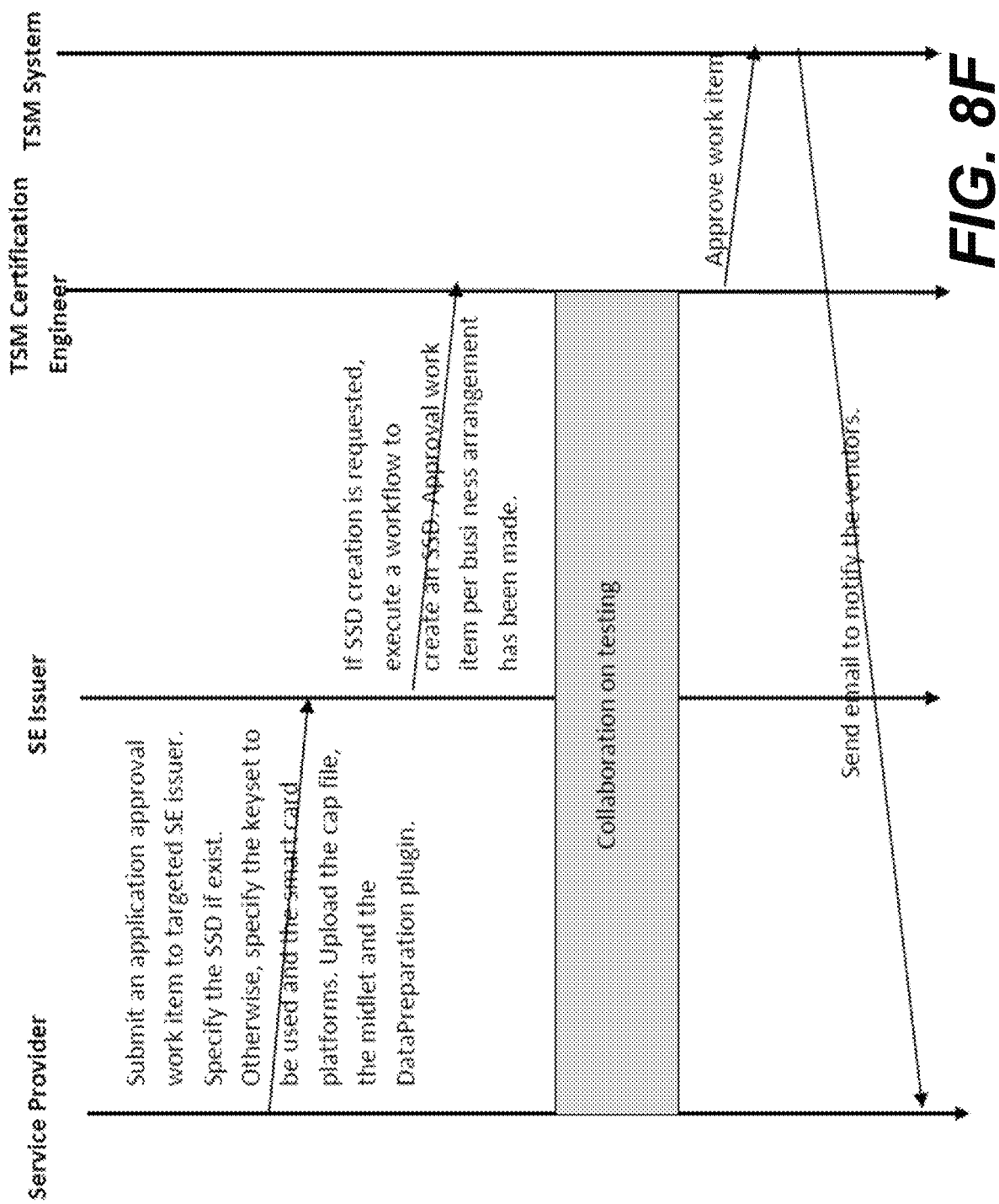

TSM Logo  Welcome, acardissuer  logout
Version 11.0 Date: Jan 15 2012

| Work Item | SE Management | Profile |

Secure Element > View SE

Menu
- Secure Element
- SE Application
- Application
- Security Domain
- Keyset
- Service Provider
- Application Owner
- TSM Context
- SE Log
- Application Log

| | | | | |
|---|---|---|---|---|
| SE No. | 00410995 | Card Type | SIM | Status | Active |
| Owner | Calvin Xie | | | Cell Phone | 5105557777 |
| Issuer Name | Card Issuer1 | | | ISD Name | nexusISD |
| Manufacturer Name | SE Factory2 | | | Batch No | 5975 |
| Available Capacity (bytes/kbytes) | 6140/60 | | | | |
| COS System | JCOP | | | Card Version | 2.4.1 |
| GP Version | 2.1 | | | DAP Key Version | 1 |
| Creation Date | Dec 1 2010 | | | | |
| Last Modified Date | Oct 5 2011 | | | Last Modified By | Justin |

Installed Applications

| Name | State | Type | Size (Byte) | Provider | SSD | Creation Date |
|---|---|---|---|---|---|---|
| PBOC EPurse | Personalized | Card & UI | 26461 | MyBank | 5 | Dec 1 2011 |
| PSE | Installed | Card | 642 | MyBank | 5 | Dec 1 2011 |

Back

METHOD AND APPARATUS FOR EMULATING MULTIPLE CARDS IN MOBILE DEVICES

BACKGROUND OF THE INVENTION

Field of the Invention

The present invention is generally related to the area of electronic commerce. Particularly, the present invention is related to a mobile device configured to support multiple cards (e.g., Mifare) or applications of similar type.

The Background of Related Art

A contactless smart card is a pocket-sized card with embedded integrated circuits that can process and store data, and communicate with a terminal via radio waves. Contactless smart cards do not contain an ordinary read-only RFID, but they do contain a re-writeable smart card microchip that can be transcribed via radio waves. Contactless smart cards can be used for identification, authentication, and data storage. They provide a means of effecting business transactions in a flexible, secure, standard way with minimal human intervention.

MIFARE is one of the most popular contactless cards used in many daily applications such as building door access, car park entrance, and transit e-purse. MIFARE or Mifare is the NXP Semiconductors-owned trademark of a series of chips widely used in contactless smart cards or proximity cards. A Mifare classic card is fundamentally just a memory storage device, where the memory is divided into segments and blocks with simple security mechanisms for access control. Many people may have more than one Mifare cards in their wallets, for example, one for transit use, one for meals, and one for admission. As mobile devices with near field communication (NFC) capability (thus NFC devices) are being advanced to replace the wallets, it is important for these NFC devices to support more than one Mifare cards. However, a current NFC device is loaded with only one emulator and could be designed to function as one contactless card, such as a Mifare card for transportation, there is a need for solutions to make an NFC device with an emulator to support or function as many Mifare cards as possible.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to techniques for mobile devices configured to support or function as multiple contactless cards, such as Mifare contactless card commonly used. According to one aspect of the present invention, a mobile device embedded with an emulator is loaded with a plurality of software modules or applications, each emulating or simulating one card or one type of contactless cards. An emulator is implemented in a secure element that is personalized for a user of the mobile device while the applications are respectively provisioned via their respective providers per the personalized secure element. When the mobile device is to be used as a contactless card to perform a set of monetary functions, a corresponding application is loaded into and executed in the emulator. When the mobile device is to be used to perform another set of monetary functions, a corresponding application is loaded into the emulator to replace the previous application entirely or partially in the emulator. As a result, the mobile device can be used as a monetary device in lieu of multiple contactless cards.

According to still another aspect of the present invention, the mobile device is a near field communication (NFC) device and being part of a mobile payment ecosystem in which various parties are work with each other in order for the mobile payment ecosystem successful. Via a server (e.g., implemented as a manager) configured to provide what is referred to herein as Trusted Service Management (TSM), the secure element in the mobile device can be remotely personalized and the applications can be downloaded, updated, managed or replaced after they are respectively provisioned via the Trusted Service Manager (i.e., the TSM server).

According to still another aspect of the present invention, for supporting the Mifare contactless cards, a module (implemented as a manager) providing Trusted Mifare Service Management (TMSM) is provided to manage the provisioned applications in the mobile device to emulate the mobile device as multiple contactless cards. A card proxy manager implemented in the mobile device to facilitate communication between the TSM server and the TMSM module in the secure element. Additional applications are also implemented in the mobile devices to provide specific functions to read only specific data from one of the applications simulating a contactless card or write transactional activities into the application.

According to still another aspect of the present invention, when an application (e.g., a Mifare contactless card or an e-purse supporting the Mifare contactless card) is being provisioned, security keys (either symmetric or asymmetric) are personalized within a three-tier security model so as to be able to perform secured transaction with a payment server. An example of the three-tier security model includes a physical security, an e-purse security and an SE security, concentrically encapsulating one with another. In one embodiment, the essential data to be personalized into the e-purse include one or more operation keys (e.g., a load or top-up key and a purchase key), default personal identification numbers (PINs), administration keys (e.g., an unblock PIN key and a reload PIN key), and passwords (e.g., from a service provider such as Mifare). During a transaction, the security keys are used to establish a secured channel between a provisioned e-purse and a Security Authentication Module (SAM) or backend server in a financial institute (e.g., bank, credit union, credit clearing bureau, etc.).

According to yet another aspect of the present invention, a portable device is configured to conduct e-commerce and/or m-commerce as an electronic mobile seller (e.g., mobile POS). E-commerce and m-commerce operations (i.e., offline payment, online payment, real time top-up, virtual top-up, batch transactions upload, and various queries of balances and transactions) can be conducted using the portable device with a POS application (e.g., a manager) and a POS SAM installed therein.

One important features, advantages and benefits in the present invention is to enable a mobile device to support multiple contactless cards. The present invention may be implemented as a single device, a server, a system or a part of system. It is believed that various implementations may lead to results that may not be achieved conventionally.

According to one embodiment, the present invention is a mobile device comprising: an emulator; a near field communication (NFC) interface to facilitate data exchange between a reader and an application being loaded and executed in the emulator, wherein the application in the emulator being one of the applications is replaceable in entirety or in part by another one of the applications; and a storage device configured to store the multiple applications, anyone of the applications being loadable into the emulator when selectively activated and subsequently replacing the application in the emulator, wherein the mobile device changes functions offered by the application to functions offered by another application newly loaded and executed in the emulator, wherein each of the applications has been remotely provisioned by a server configured to provide trusted service management (TSM).

In the embodiment, the emulator is implemented in the secure element, that is enclosed in the mobile device or in a detachable card to the mobile device. Each of the applications simulating functions of one of contactless cards is provided respectively to perform a function related to monetary, the mobile device is able to be used for all of the contactless cards when the applications are respectively loaded into and executed in the emulator.

According to another embodiment, the present invention is a method for a mobile device to support multiple applications, the method comprises: installing the applications respectively in the mobile device, each of the applications pertaining to a physical contactless card, so that the mobile device is to be used in lieu of multiple physical contactless cards.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1A shows a simplified system in which two exemplary computing devices and 104 being respectively configured to support multiple contactless cards according to one embodiment of the present invention;

FIG. 1C shows a block diagram of a simplified architecture of an NFC-enabled mobile device with a secure element (SE) that may be used in FIG. 1A;

FIG. 1D shows a flowchart or process of personalizing an SE according to one embodiment of the present invention;

FIG. 1E shows relationships among an SE manufacturer, a TSM admin and the TSM system for both offline and online modes;

FIG. 3A is a block diagram of related modules interacting with each other to achieve what is referred to herein as e-purse personalization by an authorized personnel (a.k.a., personalizing a mobile device or a secure element therein while provisioning an application);

FIG. 3B shows a block diagram of related modules interacting with each other to achieve what is referred to herein as e-purse personalization by a user of the e-purse;

FIG. 5C is a flowchart illustrating an exemplary process of enabling the portable device of FIG. 5A for services/applications provided by one or more service providers in accordance with one embodiment of the present invention;

FIG. 8F shows a data flow for the approval of an application by an SE issuer;

FIG. 9 shows an exemplary snapshot of a screen display for a personalized SE in an account.

DETAILED DESCRIPTION OF THE INVENTION

Figure 1B:
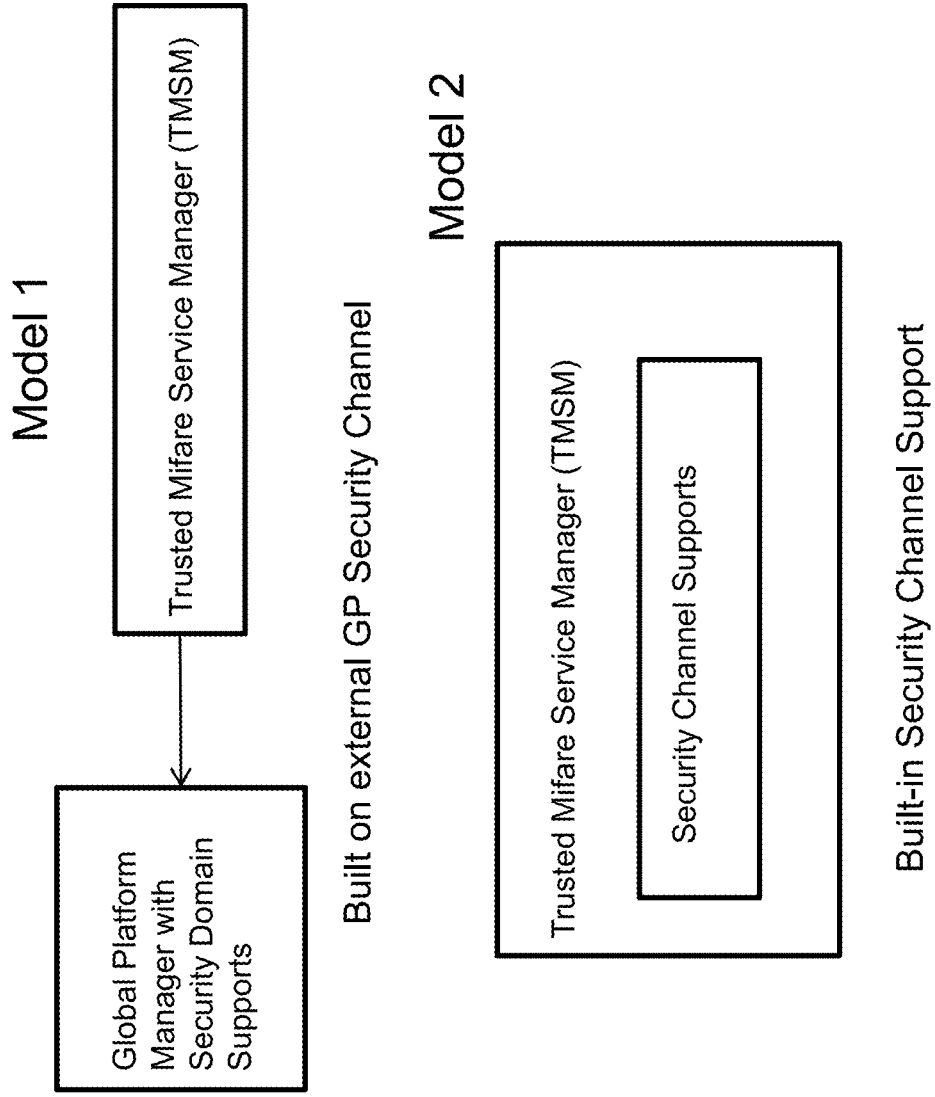
FIG. 1B shows two different models of security channel supports that may be used for an on-board trusted service manager in the mobile device.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" or "in the embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Embodiments of the present invention are discussed herein with reference to FIGS. 1A-9. However, those skilled in the art will readily appreciate that the detailed description given herein with respect to these figures is for explanatory purposes only as the invention extends beyond these limited embodiments.

Near Field Communication (NFC) presents significant business opportunities when used in mobile devices for applications such as payment, transport ticketing, loyalty, physical access control, and other exciting new services. To support this fast evolving business environment, various NFC-enabled mobile phones or devices are being advanced to support various contactless smart cards that are popularly used in various applications.

According to one embodiment of the present invention, FIG. 1A shows a simplified system 100 in which two exemplary computing devices 102 and 104 are being configured to support multiple contactless cards or used in lieu of multiple contactless cards. Instead of bringing a number of cards, each for one purpose, one embodiment of the current invention allows a user to bring only one mobile device for all uses for the cards. Unless otherwise explicitly indicated, the term of "computing device", "mobile device", "smart phone", "portable device" or "handset" will be interchangeably used herein, but those skilled in the art will understand the description herein shall be equally applicable to other devices such as a smart phone, a tablet, a laptop computer, and other portable device with the capability of near field communication.

As it is well known, Mifare is one of the most popular contactless cards used in many daily applications, where Mifare is the NXP Semiconductors-owned trademark of a series of chips widely used in contactless smart cards or proximity cards. To facilitate the understanding of the present invention, the description herein is based on the Mifare cards. Those skilled in the art shall understand that the description herein is equally applicable to cards other than the Mifare cards.

To support multiple cards, in one embodiment, an on-card Trusted Mifare Service Manager 106 (implemented as a module or an applet) is provided in a secure element (SE) 108. As further described below, depending on implementation, the SE 108 may be embedded in an NFC device 102 or 104 or a detachable card (e.g., a SD card or a microSDHC card) to a device. The NFC device 102 may be a mobile device embedded with the SE 108 while the NFC device 104 may be a smart card or a device upgradeable with a detachable card embedded with the SE 108. In one embodiment, the NFC device 104 communicates with the SE 108 via a reader 110. In any case, it is assumed that either one of the NFC devices 102 and 104 is equipped with a secure element (e.g., the SE 108) that is personalized before a function requiring security can be performed with the NFC devices 102 or 104. The details of personalizing the SE 108 will be further provided herein when it deems necessary.

According to one embodiment of the present invention, the NFC device 102 or 104 includes a card manager proxy 112 that facilitates the communication between a Trusted Service Manager (i.e., TSM server) 114 and the TMSM 106, a set of readonly wallet user interface (UI) applications 116 and transaction wallet applications 118. The card manager proxy 112 is a software module configured to execute commands (e.g., application protocol data unit commands or APDU commands) embedded in network messages on behave of the TSM 114 against the applets in the SE, and send network messages including APDU responses from the applets in the SE to the TSM 114. The readonly wallet UI 116 provides an interface to query one or more Mifare applications on information that can be accessed by well-known read sector keys or default keys, but will not modify the information in the underlying Mifare cards being supported. For example, an application can be written to display balances from many existing transit purses in different cities in China. The transaction wallet UI 118 is provided for conducting operations that will modify one or more Mifare sectors. Different write keys will be needed for altering the various sectors.

In one embodiment, the operations of the transaction wallet UI 118 includes:

1. top up balance of a transit purse after transferring money from a linking account;
2. deduct balance from a transit purse when make a payment for goods or services;
3. add a loyalty point to a partner company of a transit operator.

These operations need to modify certain sectors in a supported card or an application simulating the card to keep track of the purse balance, transaction log and/or loyalty point in an underlying Mifare card.

According to one embodiment, each pair of the readonly wallet UI applications 116 and transaction wallet applications 118 are provided by one of corresponding application/service providers 120. As will be further described below, these applications may be downloaded from a portal or provided via the TSM 114 and subsequently provisioned for a user.

Further, the TMSM 106 is a component or applet configured to be responsible for installing and personalizing the applications, and swapping one or another application into or out an emulator 122 as long as one the applications remains activated. As used herein, an emulator means a hardware device or a program that pretends to be another particular device or program that other components expect to interact with. In one embodiment, the emulator 122 emulates the Mifare classic operating system by providing the exact same hardware and/or software functionality. Once the emulator 122 (implemented in hardware or software) is installed, it responds exactly like a native Mifare chip to an interface (e.g., a reader) transmitting Mifare commands. According to one embodiment, the TMSM 106 is configured to provide the following functionalities:

1. providing a set of APIs so that a wallet application (e.g., simulating a Mifare card), when instructed by an user, can be caused to swap (i.e., activate on an emulator) an application in and out the Mifare emulator 122 so that the NFC device 102 or 104 is able to support more than one Mifare cards or applications of similar type. Depending on implementation, the APIs may replace one application in the Mifare emulator 122 with an activated application in entirety or only a portion of the original application to keep those to be used by the newly activating application. It shall be noted that an application herein does not mean that there is only one file for the application. In general, there are a number of data sets and files for one application. Therefore, when an application in the emulator is being replaced by the activated application, some data sets may be retained for use with the activated application loaded into the emulator.
2. providing a set of APIs to read off a wallet application (e.g., to read out balance or transaction history).
3. enabling the TSM 114 to remotely personalize/provision multiple Mifare applications, which includes installing application keys and application data to the TMSM 106 and later on swapping an activated one to the emulator 122.
4. enabling the TSM 114 to manage provisioned Mifare applications. This includes locking and unlocking of a Mifare application so that it cannot be swapped into the emulator 122.
5. providing a trusted environment such that an application provider can only modify its application and meta data thereof that is owned by the application provider.
6. providing a mechanism to make baseband storage as an extension for storing the software-based or logical smart cards (e.g., in lieu of multiple physical Mifare cards) swapped out from the emulator 122 to the TMSM 106, partly for solving the issue of limited memory in the emulator 122.

In one embodiment, the TMSM 106 is implemented by enhancing the Mifare4Mobile technology. Mifare4Mobile was initially developed by NXP and may support only a few of the functionalities listed above but not all. The current design of the Mifare4Mobile technology was based upon the assumption that all service providers trust a TSM (e.g., the TSM 114) and each other. A Mifare4Mobile service manager (a software module) does not have a mean to differentiate application ownerships. With an established secured channel to a Mifare4Mobile service manager, a service provider can access to all Mifare service objects (i.e., Mifare applications) installed in that manager. As a result, an application provider could easily overwrite the content of another application that is not owned by application provider.

According to one embodiment, the implementation of FIG. 1A is able to overcome the deficiency of the Mifare4Mobile technology. Besides interacting with a GlobalPlatform card manager (not shown), the card manager proxy 118 is configured to interact with the TMSM 106 for installing corresponding Mifare service objects of a Mifare application. FIG. 1B shows two different models of security channel supports that may be used for the TMSM 106. Model 1 of FIG. 1B is to make use of a security channel mechanism supported by GlobalPlatform, where GlobalPlatform is an independent, not-for-profit organization concerned with a standardized infrastructure for development and management of smart cards. Model 2 of FIG. 1B is to have a mechanism of security channel support built into a TMSM.

There are at least two types of applications/services that can be supported in the configuration of FIG. 1A; read only and transaction-based. For the read only applications, an operation can use the RETRIEVE DATA APDU to retrieve application data (e.g., balance) from the TMSM 106. PIN validation might be needed by the applications before the data can be retrieved. For the transaction-based applications, the UI application can interact with a dedicated application applet to perform a transaction. A transaction might involve more than one APDU. The respective UI applications also act as proxy to the backend server of an application provider.

As shown in FIG. 1A, the TMSM 106 includes a set of service objects and corresponding key indexes. Each logical Mifare card in the TMSM 106 is called a service object. Each application can be associated with a key set index (also called key version number) of the installed SSD (Supplementary Secured Domain) key. Currently, each SSD can support a maximum of 127 different keysets. Thus it is possible to install more than one key set on the SSD. There are many ways to assign these key sets. In an extreme case, each application has its own key set. Another way is that each application provider has its own key set and all applications from the same application providers share the same key set. In one embodiment, the Mifare4Mobile service manager is enhanced to apply access rules to the requested APDU commands based on this key association. This enhancement does not require any modification to the APDU format of the Mifare4Mobile specification v1.0.1. The extension is as follows:

1. Define a new optional tag to the proprietary content for the private meta data of a Mifare service object. This tag is used to store the key set index and establish an association between a key set and an application.
2. Add new logic to the Mifare4Mobile service manager to enforce this association when a requested APDU command is targeted to a Mifare application (i.e. service object in the TMSM 106).
3. Reserve 15 key set indices from 0x01 to 0x10 to TSM for TSM operations. For any service object that does not have associated key set index, any of this installed TSM key set indices can be used to work with the service object.

A new proprietary tag 0x8C is defined for the private meta data of a service object in the following:

| Value Name | Type | Presence | Tag | Length (bytes) | Value |
|---|---|---|---|---|---|
| Proprietary Content - SSD Key Set Index | Private Data | Optional | 8C | 1 | 1 to 127 |

If an application is assigned a dedicated key set index, this tag must be set to the index of that key set. For example, if an application is assigned a key set index 5, the private meta of that service object has a tag 8C with value 5.

This enhancement does not require any modification to the APDU format of the Mifare4Mobile specification v1.0.1. A specified key index set for a service object does not have to be pre-installed in its residing Mifare4Mobile service manager. The manager does not check the existence of the specified key set index. However, the key index set has to be put (via PUT KEY command) into the manager before the service object is activated, otherwise, no modification can be done to that service object.

When performing operations on a service object, the TSM 114 or a service provider 120 has to establish a SSD secure channel using a key set index. The key set index is specified in the INITIAL UPDATE command when sending to the Mifare4Mobile Service Manager. After the secured channel is successfully established, the Mifare4Mobile Service manager is configured to store this index. During this secured session, the Mifare4Mobile service manager enforces the following access rules to requested commands:

| Command against a service object (SO) | Allowed Key Set Index |
|---|---|
| DELETE | TSM |
| UPDATE DATA against application data | TSM or SO |
| UPDATE DATA against all data (meta and application) | TSM |
| GET DATA | No SSD |
| RETRIEVE DATA | No SSD |
| ACITIVATE | No SSD |

Each row defines an access rule of a command. The first column is a requested APDU command. The second column indicates what the key indices are allowed to perform the command. The TSM 114 denotes a set of key indices assigned to the TSM 114. SO indicates a key index associated with that Mifare service object. It shall be noted that it is not any service object key set index but the associated key set index for the Mifare service object specified in the 8C tag.

For supporting locking and unlocking a Mifare application, two APDUs are added to the Mifare4Mobile Service Manager. These two APDUs are TSM based API. A TSM security channel must be established between the TSM 114 via the card manager proxy 112 to the TMSM 106 before the commands can be issued against a Mifare application. Upon receiving the commands, the TMSM 106 sets the corresponding Mifare service object to an appropriate status. It is noted that the Mifare4Mobile service manager is extended with an additional lock state. If a Mifare application is locked, a wallet application is not able to swap (i.e., activate) that Mifare application. The TSM 114 will have to unlock that application before the Mifare application can be swapped into the emulator 122.

As the memory, especially in a smartcard, is very limited, one implementation is to allow the service objects to be swapped to the baseband persistent storage from the TMSM 106. The baseband persistent storage (not shown) maintains a mapping table. Each row of the table contains information about a service object. At least the following information is kept; the service object ID (SOID) of a service object, and a service object in an encrypted format. The TMSM 106 will encrypt a service object before it is swapped out therefrom.

According to one embodiment, the TMSM 104 has a new swapping counter. Upon a successful swapping, the counter is incremented by 1. The TMSM 104 maintains a swapping table to keep track of the SOs that are currently swapped out. This table shall maintain two columns: the SOID and a value of the swap counter when the SO was swapped. When an SO is swapped, the encryption of the following information is returned to the baseband for storage: value of the swap counter and the service object. In the embodiment, the encryption key can be the mifare4mobile DEK key or a new key personalized into the TMSM applet 106 specifically for this purpose. The encryption is recommended to be 3DES with CBC mode using all zeros for initial vector.

In addition, each service object is enhanced with a new attribute to indicate whether the service object is allowed to be swapped to the baseband storage. This indicator is set when the service object is installed. In one embodiment, the Mifare4Mobile APDU command set for the TMSM is enhanced as follows:
1. a new APDUs for swapping a service object to the baseband storage.
2. the applet behavior is modified when receiving the Mifrae4Mobile ACTIVATE or INSTALL command.

According to one embodiment, the details of the modification are as follows:
1. Swap command: ask the applet to find and mark a service object that can be swapped to the baseband. This service object must be swappable and has the oldest access time stamp. This requests that an APDU request shall have the following characteristics:
   a. The command option P1 has a value to indicate it is swappable for activation or swappable for installation.
   b. The request data contains one or two pieces of information:
      i. the service object ID to be swapped to the applet (e.g., emulator).
      ii. the encrypted service object to be swapped if it is swappable for activation. This encrypted service object is retrieved from the baseband, wherein there is a mapping table based on the given SOID.
   Upon receiving the request, the TMSM 106 first performs validation to ensure the APDU is proper. In addition, if the SOID has already in the applet, then an error code is returned to indicate that the SOID is in the applet. If the request includes an encrypted service object, the TMSM 106 has to recover the service object and the swapped counter from the encrypted data. The TMSM 106 is then configured to verify the counter against the swapping table. If both counters are not matched, it returns an error message to indicate the data has been corrupted. This decrypted SO is kept and used in the next ACTIVATE command. On the other hand, upon successful execution, the APDU response contains two pieces of information: the ID of the SO that will be swapped out of the Applet, and the encryption of this SO and a swap counter. If the next immediate command that the TMSM 106 receives is neither ACTIVATE nor INSTALL, it will unmark the service object.
2. Activate or Install for Install commands: These two commands are modified with the following behavior.

Upon receiving one of these two commands, the TMSM 106 checks to see whether there is a marked swapped SO. If not, the subsequent behavior shall be the same as the original commands. Otherwise, it checks to ensure that APDU matches the purpose for swapping in the previous Swap command. The request is rejected if it is not matched. If the APDU passes the test, the marked swapped SO will be deleted. For the case of ACTIVATE, the previously encrypted data will be used to update the SO table. After that, the subsequent behavior will be the same as the original commands.

According to one embodiment, a layer of SDK is provided for the baseband so that when activating or installing a SO,
1. For activate command, it will check to see the mapping table maintained in the baseband whether the service object is in the baseband. If it is not, it simply issues the original activate command to the applet. Otherwise, it jumps to step 3 below.
2. For install, it bypasses the above checking and jumps to step 3.
3. The swapping steps are as follow:
   a. it issues a swap command to the TMSM applet. The SDK retrieves the SO based on the SOID from the mapping table to prepare the swap APDU command.
   b. If the response contains encrypted data and its SOID, the SDK will use the information in the response to update the mapping table.
   c. It then issues the original ACTIVATE or INSTALL command.

Referring now to FIG. 1C, that shows a block diagram of an exemplary computing (mobile) device 130 that may be used in FIG. 1A. The computing device 130 includes a near field communication (NFC) controller 131 that enables the device 130 to interact with another device wirelessly to exchange data with. For example, a user may use the mobile device 130 as an e-purse or a wallet to pay for a purchase or an admission. In operation, the e-purse is controlled by a secure element (SE) 132. Essentially, the SE 132 enables such a mobile device 130 to perform a financial transaction, transport ticketing, loyalty, physical access control, and other exciting new services in a secured manner. To offer such services, the SE 132 is configured to support various applets, applications or modules (by way of example, only two exemplary applications 134 and 136 are shown in FIG. 1B). Depending on implementation, these applications or modules may be hardware modules embedded or inserted thereon, or software modules downloadable from one or more servers via a data network.

When a mobile device is first purchased by or delivered to a customer, the SE 132 in the mobile device is installed with a set of default keys (e.g., an Issuer Security Domain (ISD) key set by the SE manufacturer). In one embodiment, the SE 132 is a tamper-proof chip capable to embed smart card-grade applications (e.g., payment, transport . . . ) with the required level of security and features. In FIG. 1B, the SE 132 is embedded or associated with various applications (e.g., NFC-related) and is connected to the NFC controller 131 to act as the contactless front end. Typically, a standard-compliant SE comes with one issuer security domain (ISD) and an option for one or more supplemental security domains (SSD). Each of these domains includes a set of keys. In one embodiment, the SE 132 is a chip embedded in the mobile device 130 or in a miniature card inserted into the mobile device 130 via a card interface 139. In another embodiment, the SE 132 is or includes a software module loaded in a secured memory space 137 in the mobile device 130. The software module may be updated by downloading updating components from a designated server using a network interface 133 (e.g., a 3G network or an LTE network) in the mobile device 130.

The SE 132 needs to go through a personalization process before it can be used. In one embodiment, the personalization process is to load the SE 132 with or update a key set with a derived personalized key set of a chosen card issuer (i.e., a so-called SE issuer). Depending on situation, an SE issuer and an SE manufacturer may be two separate entities and a single entity. To facilitate the description of the present invention, the SE issuer and the SE manufacturer will be described herein as if they are two separate entities. Further, a personalization process may be also referred to as a provisioning process. According to one embodiment, the SE provisioning process is performed over the air (OTA) to cause the SE to be personalized while installing an application or enabling a service (i.e., application installation and personalization). The personalization of an SE is only done once the SE is associated with an SE issuer. The application installation and provisioning shall be done for each application when a user subscribes or installs an application.

In one embodiment, when updating or upgrading the SE 132, only one or some components pertaining to the SE 132 are replaced by newer updates to avoid personalizing the SE 132 from beginning. Depending on implementation, such newer updates may be automatically or manually obtained to be loaded into the mobile device 130. In one embodiment, applications are available for an NFC-enabled mobile device for downloading from a server or a TSM portal depending on the corresponding SE issuer and the TSM thereof.

TSM, standing also for Trusted Service Management, is a collection of services. One main role envisaged for the TSM is to help service providers securely distribute and manage contactless services for their customers using the networks of mobile operators. The TSM or its server(s) does not necessarily participate in actual contactless transactions involving the NFC devices. These transactions are processed normally in whatever system the service provider and its merchant partners have already put in place. Another role of the TSM is to accelerate the successful deployment and ramp-up of mobile NFC applications by acting as a commercial intermediary that facilitates contractual arrangements and other aspects of ongoing business relationships among different parties that make the commerce via the mobile networks possible.

The personalization process can be done either physically in a service center or remotely via a web portal by a TSM server. In the first scenario, the customer may physically go to a service center to let a service representative to personalize the SE in a mobile device. With a computer connected to an NFC reader at a designated place (e.g., a service center), a provisioning manager can be either an installed application or a web-based application connecting to a backend TSM. The provisioning manager is configured to communicate with the SE of the mobile device (e.g., via a reader). Such a personalization process is referred to as a process Over the Internet (OTI).

In the second scenario, the customer registers his/her mobile phone via a server (often a TSM web portal). The TSM server is configured to push a universal resource identifier (URI) of a provisioning manager to the registered mobile phone. Depending on a type of the device, the push can be either an SMS (Short Message Service) Push or a Google Android Push. The customer can download the provisioning manager into the mobile device and start the personalization process. Such a personalization process is referred to as a process Over the Air (OTA).

In either one of the scenarios, the provisioning manager acts as a proxy between the SE in the mobile device and the TSM server. Referring now to FIG. 1D, it shows a flowchart or process 150 of personalizing an SE according to one embodiment of the present invention. Depending on implementation, the process 150 may be implemented in software or a combination of software and hardware. When a user receives a new NFC device (e.g., a part of a mobile device), the SE therein needs to be personalized.

At 152, the new NFC device is determined if it is a genuine NFC device. One example is to check a serial number associated with the NFC device. The serial number may be verified with a database associated with a TSM server. In the example of an NFC mobile device, the device serial number of the mobile device may be used for verification. It is now assumed that the NFC device is a genuine device (recognizable by a mobile operator). The process 150 goes to 154 to have the NFC device communicated with a dedicated server. In one embodiment, the server is a part of the Trusted Service Management (TSM) system and accessible via a wireless network, the Internet or a combination of wireless and wired networks (herein referred to as a data network or simply a network).

At 156, the NFC device is registered with the server. Once the NFC device becomes part of the system, various services or data may be communicated to the device via the network. As part of the personalization process, the server requests device information of the SE at 158. In one embodiment, the server is configured to send a data request (e.g., a WAP PUSH) to the device. In responding to the request, the device sends back CPLC (card product life cycle) information retrieved from the SE. The CPLC includes the SE product information (e.g., the smart card ID, manufacturer information and a batch number and etc.). Based on the CPLC info, the server is able to retrieve corresponding default Issuer Security Domain (ISD) information of this SE from its manufacturer, its issuer, an authorized distributor or a service provider. Depending on implementation, there are two ways that the server may communicate with an SE distributor or manufacturer, which will be fully discussed herein late when deemed appropriate.

At 160, it is up to the manufacturer whether to update the device information. In general, when an SE is shipped from the manufacturer, the SE is embedded with some default device information. If it is decided that the default information such as the CPLC data is to be updated with the manufacturer, the process 150 goes to 162, where the manufacturer uploads corresponding updated device information to the server. The updated device information is transported to the device and stored in the SE at 164. If it is decided that the default information in the SE is not to be updated with the manufacturer, the process 150 goes to 164 to store the retrieved default device information in a database with the TSM server. In one embodiment, the server is configured to include an interface to retrieve a derived SE key set from the mobile device. According to one embodiment, the derived key set is generated with the device information (e.g., ISD) of the SE. When the derived ISD key set is successfully installed on the SE, the corresponding SE issuer is notified of the use of the derived ISD key set.

According to one embodiment, the device information (default or updated) is used to facilitate the generation of a set of keys at 166. In operation, the server is configured to establish a secured channel using the default ISD between its hardware security module (HSM) and the SE. The server is also configured to compute a derived key set for the SE. Depending on a business agreement, a master ISD key of an issuer for the SE may be housed in a hardware security module (HSM) associated with the server or in a local HSM of the SE issuer. An HSM is a type of secure cryptoprocessor provided for managing digital keys, accelerating crypto-processes in terms of digital signings/second and for providing strong authentication to access critical keys for server applications. If it is housed in the HSM of the server, the server is configured to instruct the HSM to compute the derived key set. Then, the server prepares a mechanism (e.g., PUT KEY APDU) and uses the default channel to replace the default key set originally in the SE with the derived key set. If the master ISD key of the SE issuer is in a local HSM of the SE issuer, the server is configured to interact with the remote HSM to retrieve the keys.

At 168, the set of keys is securely delivered to the SE. The set of keys is thus personalized to the SE and will be used for various secured subsequent operations or services with the NFC device. The server at 130 is configured to synchronize the SE with the issuer or provider (e.g., sending a notification thereto about the status of the SE). After the personalization, the SE can only be accessed using the personalized ISD key of the SE issuer. Depending on the security requirement of each service provider, the TSM can create additional SSDs for the various providers to personalize their respective applications (e.g., the modules 134 or 136 of FIG. 1C).

As mentioned above, there are two ways that may be used to retrieve the corresponding default Issuer Security Domain (ISD) information from the SE in interfacing with the manufacturer thereof. Depending on the infrastructure, a manufacturer can choose to use a real-time approach or a batch approach.

In the real-time approach, the server is configured to communicate with the manufacturer (i.e., its server thereof) when an SE by the manufacturer is being personalized by the TSM server. The default key set is, thus, retrieved on demand from the server of the manufacturer. In one embodiment, the TSM server includes a plug-in module for each of the manufacturers to communicate therewith.

Figure 1F:
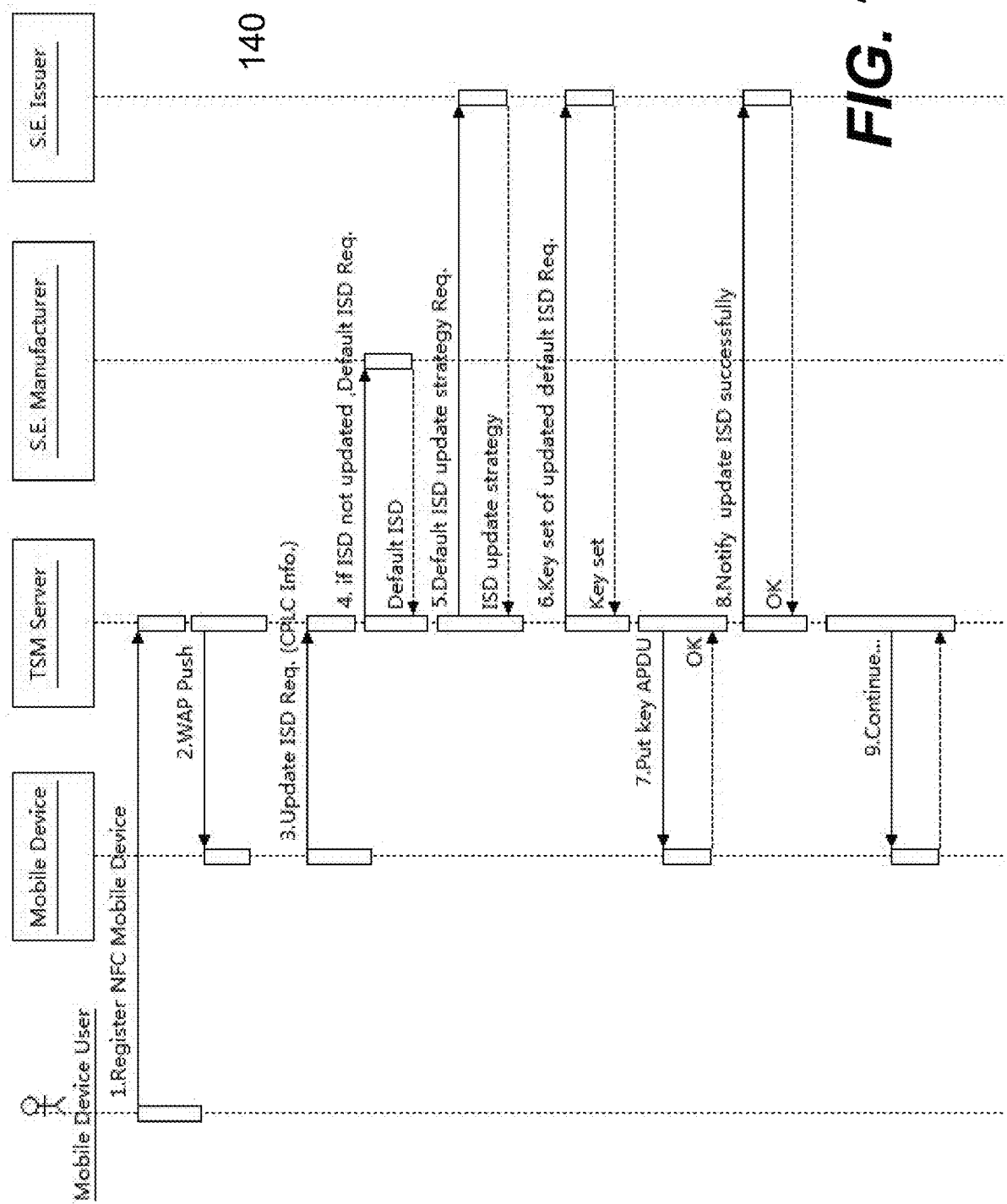
FIG. 1F illustrates data flows among a user for an NFC device (e.g., an NFC mobile phone), the NFC device itself, a TSM server, a corresponding SE manufacturer and an SE issuer.

In the batch approach, it can be done either offline mode or online mode. In the offline mode, the SE manufacturer delivers the default ISD information for all SEs being supported via an encrypted physical media. An administrator for the TSM may or a computing device may be configured to import the information in a media to a computing device. The default ISDs are then decrypted and retrieved, and stored in a database. In the online mode, the SE manufacturer uploads the default ISD information for the SEs it supports via a network. The default ISDs are then decrypted and retrieved, and stored in a database. Afterwards, the TSM only needs to access its own HSM o the database during an SE personalization process. FIG. 1E shows respective relationships among the SE manufacturer, the TSM admin and the TSM system for both offline and online modes. FIG. 1F illustrates data flows among a user for an NFC device (e.g., an NFC mobile phone), the NFC device itself, a TSM server, a corresponding SE manufacturer and an SE issuer according to one embodiment.

In one perspective, the SE 132 of FIG. 1C may be perceived as a preload operating system in a smart card, providing a platform for PIN management and security channels (security domains) for card personalization. The SE 132 combines the interests of smart card issuers, vendors, industry groups, public entities and technology companies to define requirements and technology standards for multiple applications running in the smart cards. As an example, one module 134 referred to as an e-purse security defines a set of protocols that enable micro payment transactions to be carried out over a data network. With an electronic purse (a.k.a., e-purse application) stored on a smart card, a set of keys (either symmetric or asymmetric) is personalized into the e-purse after the e-purse is issued. During a transaction, the e-purse uses a set of respective keys for encryption and MAC computation in order to secure the message channel between the e-purse and an SAM (Security Authentication Module) or backend servers. For a single functional card, the e-purse security 134 is configured to act as gates to protect actual operations performed on a single functional card. During personalization, the single functional card access keys (or its transformation) are personalized into the e-purse with the e-purse transaction keys.

Figure 1G:
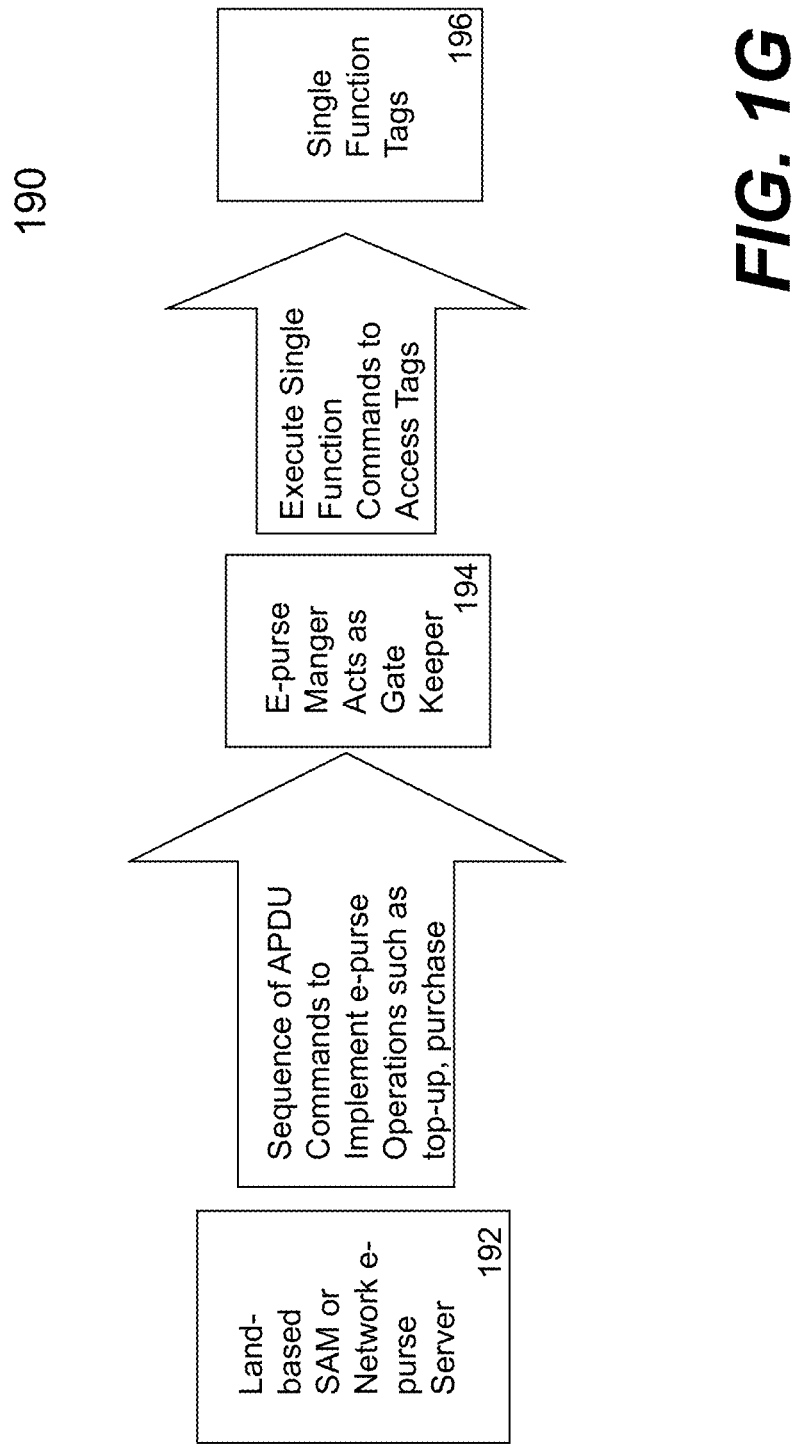
FIG. 1G shows a data flowchart or process of personalizing data flow among three entities: a land-based SAM or a network e-purse server, an e-purse acting as a gatekeeper, and a single function tag, according to one embodiment.

As an example, it is assumed that an installed application, e-purse or a Mifare card, has been provisioned with the SE. FIG. 1G shows a flowchart or process 190 of data flow among three entities: a land-based SAM or a network e-purse server 192, an e-purse 194 acting as a gatekeeper, and a single function tag 196. Communications between the land-based SAM or the network e-purse server 192 and the e-purse 194 are conducted in sequence of a type of commands (e.g., APDU) while communications between the e-purse 194 and the single function tag 196 are conducted in sequence of another type of commands, wherein the e-purse 194 acts as the gate keeper to ensure only secured and authorized data transactions could happen.

In one embodiment, the physical security for the e-purse is realized in an emulator. As used herein, an emulator means a hardware device or a software module that pretends to be another particular device or program that other components expect to interact with. The e-purse security is realized between one or more applets configured to provide e-purse functioning and communicate with a payment server. An SE supporting the e-purse is responsible for updating security keys to establish appropriate channels for interactions between a payment server and the applets, wherein the e-purse applet(s) acts as a gatekeeper to regulate or control the data exchange.

Figure 2A:
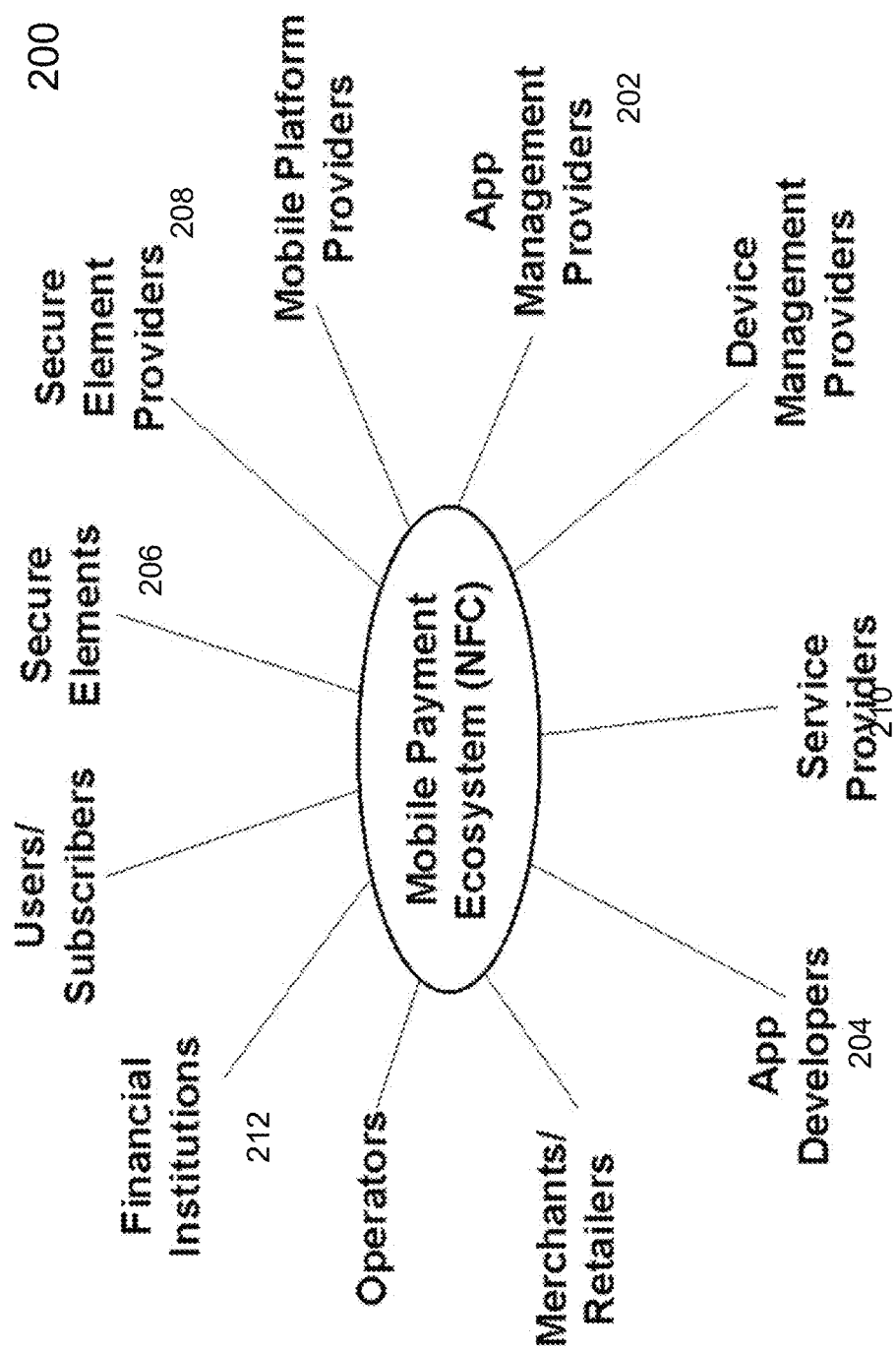
FIG. 2A shows a mobile payment ecosystem in which related parties are shown in order for the mobile payment ecosystem successful.

Referring now to FIG. 2A, it shows a mobile payment ecosystem 200 in which related parties are involved in order for the mobile payment ecosystem successful. According to one embodiment, an NFC device is allowed to install or download one or more applications from respective designated servers 202 (i.e., application management providers), where the applications are originally developed by developers 204 and distributed by service providers 210, application management providers 202 or others. It is assumed that the secure element 206 provided by a secure element provider 208 has already been personalized via a TSM or a trusted third party (e.g., a financial institution 212).

Once an application is installed in an NFC device, the next step is to provision the application with the secure element. An application provisioning process can be started in several ways. One of the ways is that an SE holder selects an application from a TSM portal on the mobile device and initiates the provisioning process. Another one is that the SE holder receives an application provisioning notification on the mobile device from the TSM on behalf of an application (service) provider.

The TSM or application providers can publish their applications on a TSM portal to be downloaded to a mobile device with the SE and/or subscribed at a request of a user (a.k.a., an SE holder). In one embodiment, the TSM is a cloud service to serve many SE issuers. Thus, many applications from various service providers are available on the TSM portal. However, when getting onto the TSM portal, SE holders can only see those applications approved by its own SE issuer. Depending on the arrangement between an SE and a service provider, an application can either be downloaded/installed/personalized using the ISD keyset of the SE or a specific SSD keyset of the service provider. If a SSD keyset has not been installed on the SE, it can be installed during an application installation.

The TSM is designed to know the memory state or status of an SE for various SSDs. Based on the state of the SE and the memory allocation policy of the SSDs, the available applications for the various SSD in the application store may be marked with different indicators, for example, "OK to install", or "Insufficient memory to install". This will prevent unnecessary failure for users.

Once an application is installed on an NFC device, the application initiates a provisioning process by itself, or the TSM can push a provisioning notification to the NFC device via a cellular network or a wireless data network. Depending on the type of the devices, there are many different types of push messages to cause the NFC device to initial the provision process. An example of the push methods includes an SMS push or an Android Google Push. Once a user accepts the notification, the provisioning process starts. The details of the provisioning process will be described below whenever deemed appropriate.

As part of the application provisioning, a TSM server implements some protective mechanism. One is to prevent an SE from being accidentally locked. Another is to disable application download if there is no sufficient memory on SE. In some cases, an SE may permanently lock itself if there are too many failed mutual authentications during secure channel establishment. In order to prevent the SE from being accidentally locked, the TSM keeps the track of the number of failed authentications between an SE and the TSM when establishing a secured channel between the two entities. In one embodiment, the TSM is configured to reject any further request if a preset limit is reached. The TSM can continue to process the SE request if the SE is reset at the service center manually.

The TSM also keeps track of the memory usage of each SE. The TSM decides whether an application can be installed on an SE based on the memory allocation assigned by the SE issuer to each service provider. According one embodiment, there are three types of policies:

pre-assigned fixed memory to guarantee a space of fixed capacity.

pre-assigned minimum memory to guarantee a space of a minimum capacity (implying that the capacity may be expanded under some conditions).

best efforts (e.g., a contractual provision which requires the SE issuer to use its highest efforts to perform its obligations and to maximize the benefits to be received by the user).

According to one embodiment, an SE issuer uses a TSM web portal to make this assignment.

1. For a batch of SE, the SE issuer can pre-assign a memory policy for a service provider to install its applications via the TSM web portal;
2. The TSM server verifies whether the space of the respective service provider conforms to its policy when a mobile device requests to install one of its applications. If not conformed, this request is rejected, otherwise, the TSM server will proceed to handle the provisioning request;

3. If the provisioning succeeds, the TSM will accumulate the memory size of this application service.

When a mobile user subscribes to a mobile application (assuming it has been installed), the application has to be provisioned with the SE in the mobile device before it can be used. According to one embodiment, the provisioning process includes four major stages:
- to create an supplemental security domain (SSD) on the SE, if needed;
- to download and install an application cap on the SE;
- to personalize the application on the SE; and
- to download a UI component on mobile phone.

Figure 2B:
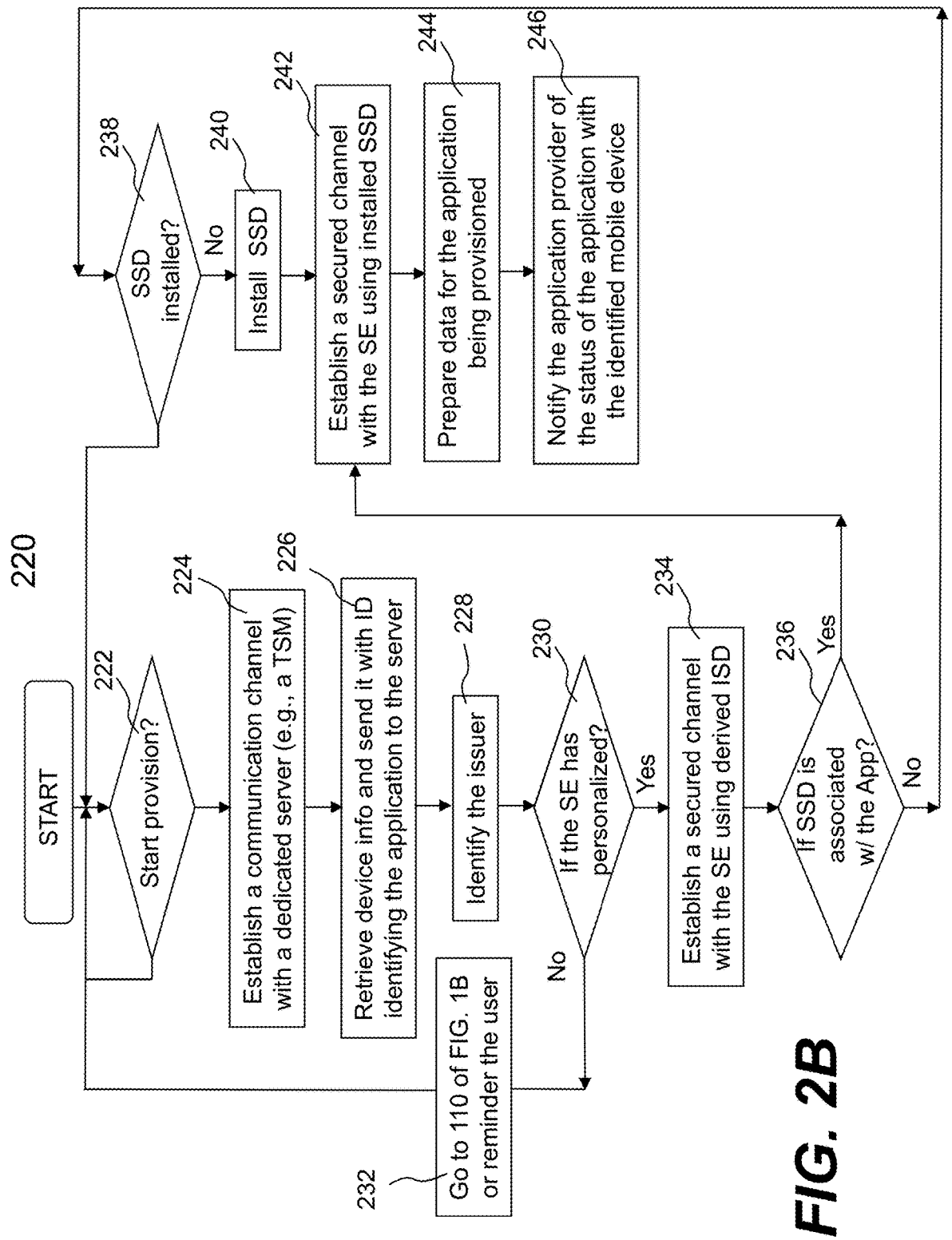
FIG. 2B shows a flowchart or process of provisioning one or more applications according to one embodiment.

FIG. 2B shows a flowchart or process 220 of provisioning one or more applications according to one embodiment. The process 220 may be implemented in software or a combination of software and hardware. In one embodiment, the application provisioning process 220 needs to go through a provisioning manager (i.e., proxy) on the mobile phone to interact with the SE therein.

As shown in FIG. 2B, at 222, the application provisioning process 220 may be started manually or automatically. For example, a user may initiate the process 220 by selecting an installed application to subscribe related services or the installed application, when activated, initiates the provisioning process, provided it has not been provisioned. In another embodiment, a provider of an application pushes a message (e.g., SMS) to the mobile phone to initiate the provisioning process.

In any case, the process 220 goes to 224 to establish a communication with a dedicated server (e.g., a TSM server or a server operated by an application distributor) after the device information (e.g., CPLC) is retrieved from the SE in the mobile device. The device information along with an identifier identifying the application is transmitted to the server at 226. Based on the device information, the server identifies the issuer for the SE first at 228 to determine if the SE has been personalized at 230. If the SE has not been personalized, the process 220 goes to 232 to personalize the SE, where one embodiment of the function 232 may be implemented in accordance with the process 150 of FIG. 1B.

It is now assumed that the SE in the mobile device has been personalized. The process 220 now goes to 234 to establish a secure channel with the SE using the derived ISD. Depending on who houses the HSM (TSM or SE issuer) for the ISD, the server will contact the HSM to compute the derived ISD for the SE and establish a secure channel with the SE using this derived ISD. The server is then configured to check to see whether there is an SSD associated with this application at 236. If there is not an SSD associated with the application, the server is configured to check a database to see whether it has been installed with this SE. If the SSD installation is needed, then the process 220 goes to install the SSD. In one embodiment, the user is alerted of the installation of the SSD (keys). Should the user refuse to install the SSD at 238, the process 220 stops and goes to 222 to restart the provisioning process 220.

It is now assumed that the process of installing the SSD proceeds at 240. Installing the SSD is similar to installing the ISD. The TSM server is configured to contact the HSM that houses the SSD master key to compute the derived SSD key set for the SE. The master SSD key set can be either in the TSM or with the service provider or the SE issuer, largely depending on how the arrangement is made with all parties involved.

Figure 2C:
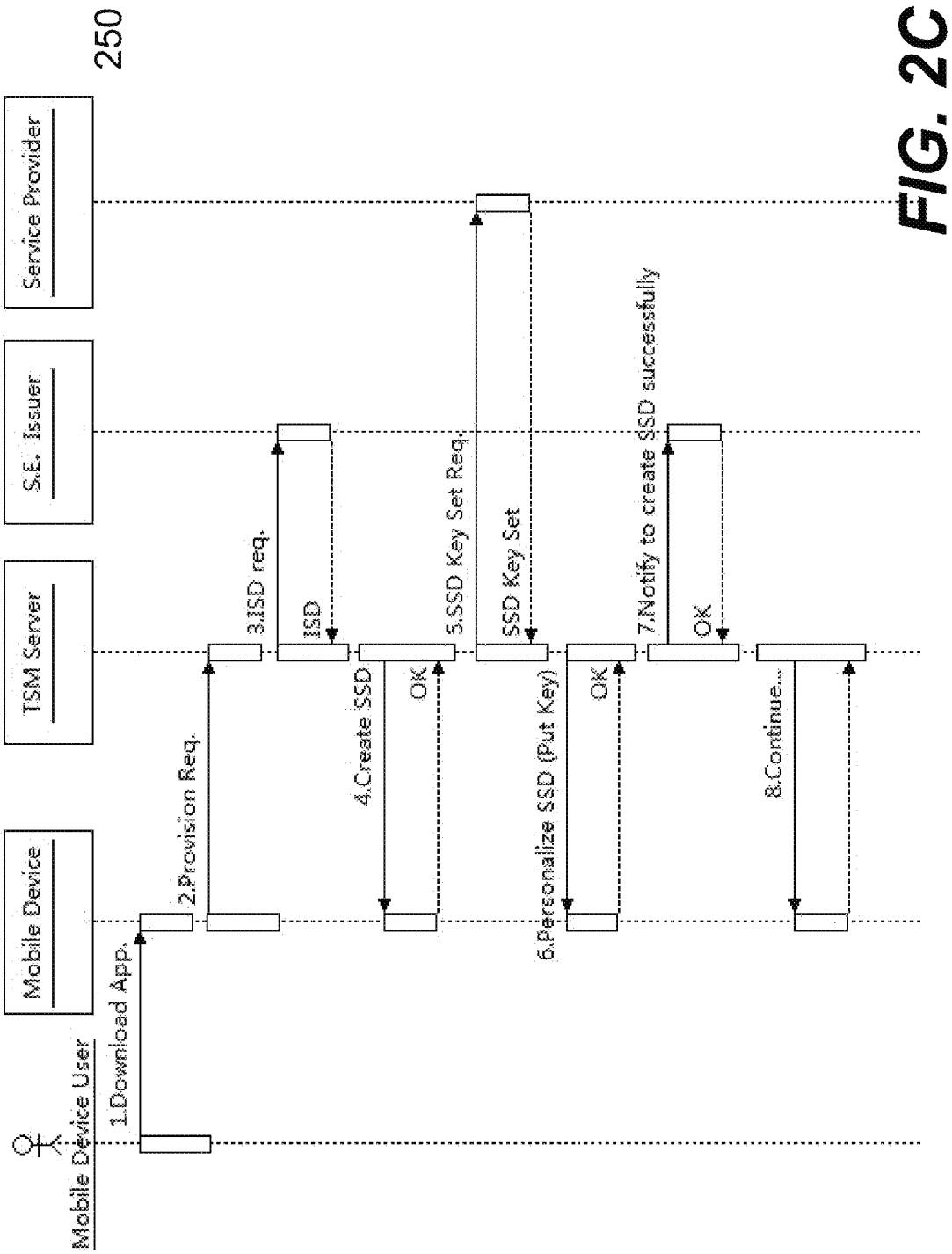
FIG. 2C shows a data flow illustrating various interactions among different parties when an application is being provisioned in one embodiment.

To download/install the application to the SE, the server is configured to establish a secure channel with the SE using this derived SSD at 242. In one embodiment, this is similar to how the ISD-based secure channel is established. At 244, the data for the application is prepared, the detail of which will be further discussed below. According to one embodiment, the server is configured to contact the service provider to prepare asset of APDUs, such as STORE DATA APDUs, where ADPU stands for Application Protocol Data Unit. Depending on an application installed in a mobile device, the server may be caused to repeatedly issue STORE DATA to personalize the application with the SE. Additional data including an appropriate interface (e.g., a user interface of the application per the mobile device) may be downloaded provided that the provisioning process is successfully done. At 246, the server will notify the application provider the status of the application that has been provisioned. According to one embodiment and the above description, FIG. 2C shows a data flow 250 illustrating various interactions among different parties when an application is being provisioned in one embodiment.

As shown in 244 of FIG. 2B, one of the important functions in provisioning an application is to prepare customized application data for the targeted SE. For example, for an e-purse application, the personalized data for the application includes various personalized transaction keys generated based on the device information (e.g., CPLC info) of the SE. For transit e-purse, part of the personalized data includes the Mifare access keys derived from an identifier (ID) of the Mifare card, the server is configured to personalize both Java Card applications and Mifare4Mobile service objects. In general, there are at least two different ways to prepare the data to facilitate subsequent transactions.

For data preparation, one embodiment of the present invention supports two operation modes to interact with service providers for computing the personalized application data. For the first mode, a TSM server does not have direct access to the HSM associated with a service provider. The service provider may have a server interacting with its HSM to generate the application keys (e.g., Transit, e-purse, or Mifare Key). The TSM data preparation implementation is to make use of application program interfaces (API) or a protocol provided by the server to request for derived application keys. The second mode is that data preparation implementation can directly access the HSM associated with the service provider to generate the application keys.

Figure 2D:
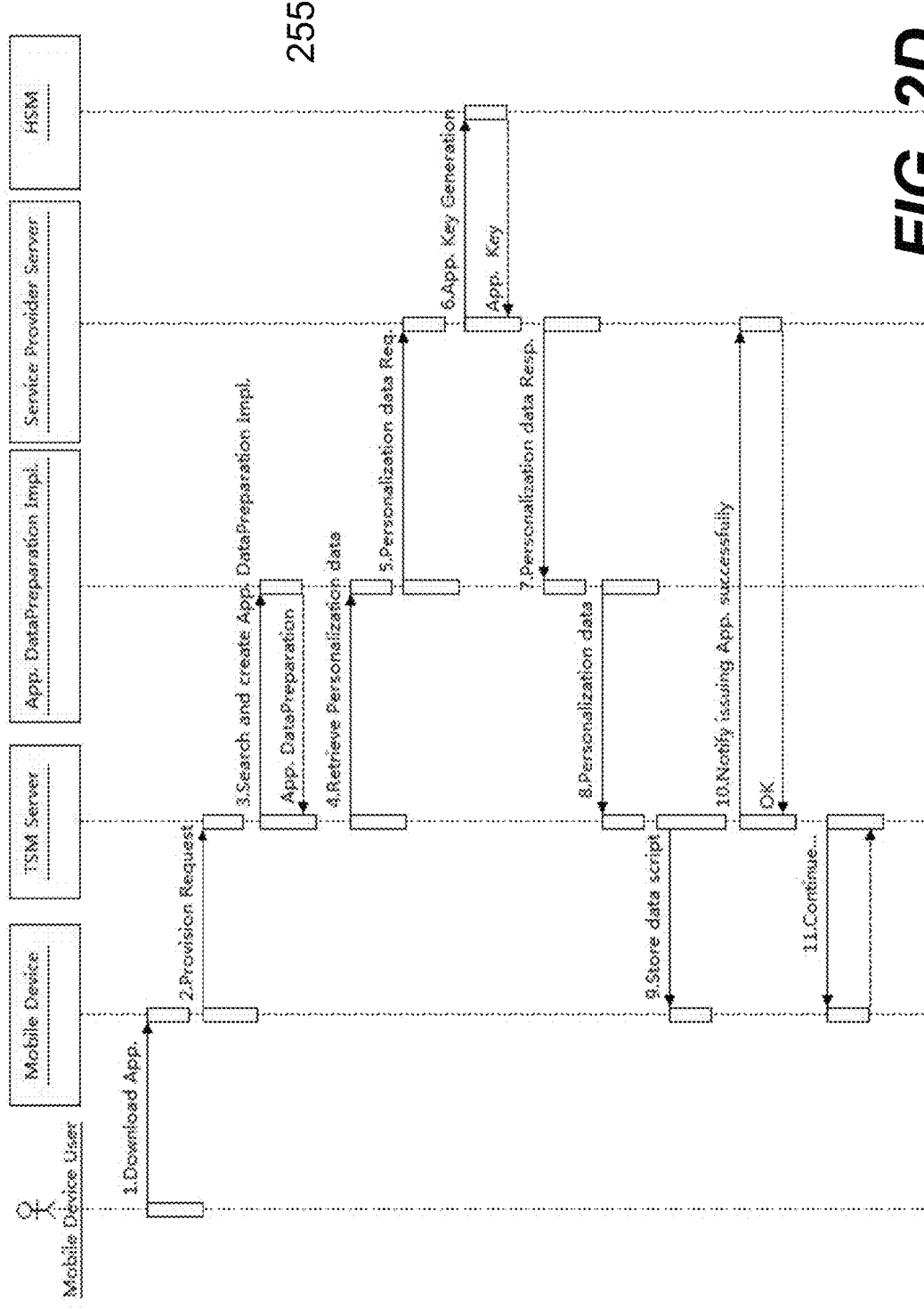
FIG. 2D shows a data flow among different entities when preparing the application data in provisioning an application.

According to one embodiment, FIG. 2D shows a data flow 255 among different entities when preparing the application data in provisioning an application. FIG. 2D is provided to show the first mode in which a TSM server does not have direct access to the HSM associated with a service provide. The second mode has a similar flow except that the application data preparation implementation will interact directly with the HSM of a service provider.

Figure 2E:
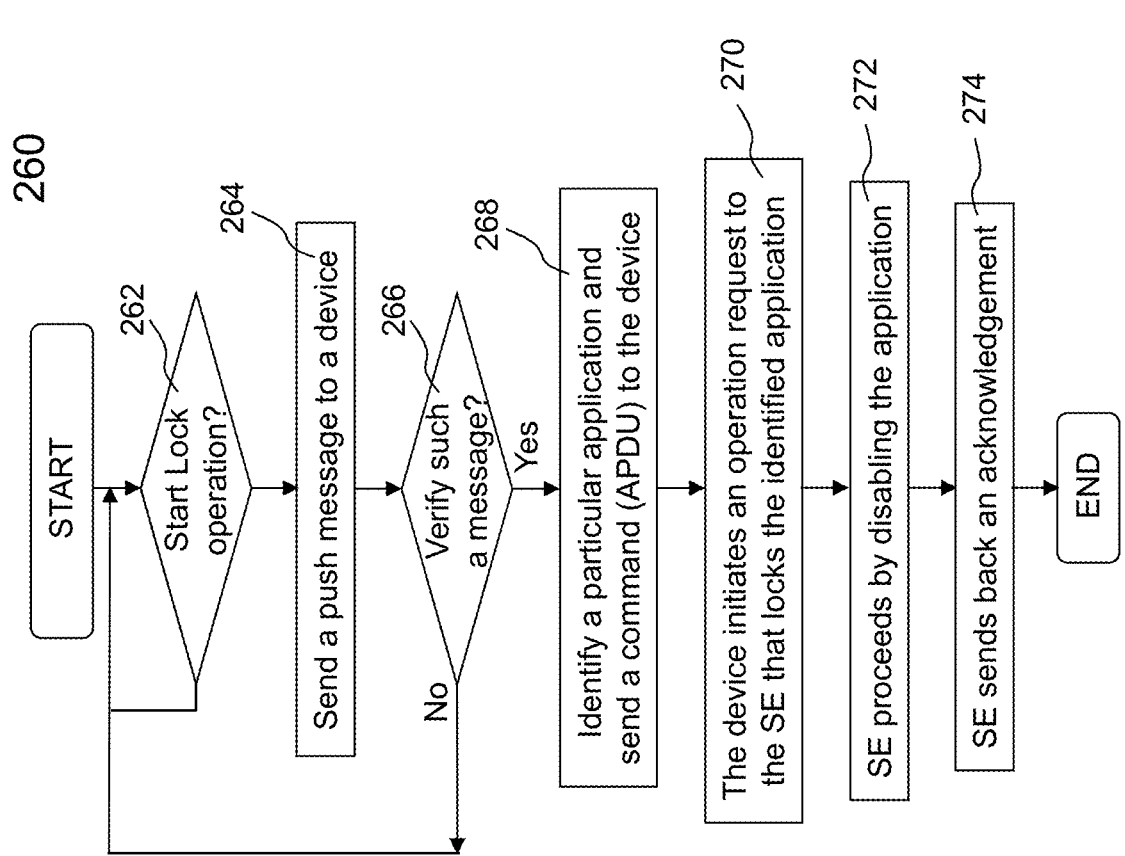
FIG. 2E shows a flowchart or process for locking or disabling an installed application.

Besides supporting a provisioning process, one embodiment of the present invention also supports the life cycle management of an SE. The life cycle management includes, but may not be limited to, SE lock, SE unlock, Application Delete (disabling). The initiation of these activities may be through a TSM push notification. In actual use of mobile devices, FIG. 2E shows a flowchart or process 260 of locking an installed application. An NFC device may have been installed with a number of applications in connection with or running on top of the secured element therein. For some reason (e.g., no activity for a prolonged period or expiration), an application needs to be disabled or locked by its distributor or provider.

FIG. 2E shows an operation or process 260 to disable an installed application. The process 260 is initiated at 262. In one embodiment, the process 260 is initiated by an operator manually via a TSM web portal. In another embodiment, the process 260 is automatically initiated by a service provider internal workflow (e.g., using TSM web service API). Once the process 260 is initiated, a message is pushed to an NFC device (e.g., within a mobile device) in which an application is to be disabled. Depending on application, such a message may come in different forms. In one embodiment, the message is a PUSH command. In another embodiment, the message is a TCP/IP request delivered to the device via a network. The message may be sent from a server (e.g., a TSM server) at 264. Depending on implementation, such a message may include an identifier identifying an application to be locked or disabled. Upon receiving such a message, a card manager proxy on the device is caused to verify whether such a message is indeed from its original distributor or provider by returning a message at 266. According to one embodiment, the message is sent to the TSM server for verification. If the verification fails, namely there is no acknowledgement to such an inquiry, the process 260 is abandoned.

It is now assumed that the verification is successful, namely the inquiry from the device to a provider of the application returns an acknowledgement that the original request is authenticated. In general, such an acknowledgement includes an identifier confirming the application to be locked at 268. The TSM server is configured to establish a secure channel with the SE as described previously. Then, the TSM server is to prepare appropriate APDUs (such as SET STATUS, or/and DELETE) for the SE for execution via the card manager proxy.

In any case, in responding to the command, the SE proceeds by locking the application at 272. According to one embodiment, the SE is caused to disassociate with the application, thus making the installed application no longer usable with the SE. At 274, the SE is configured to send out an acknowledgement to notify related parties that this application is no longer operating in the device. In one embodiment, the acknowledgement is sent over to the TSM server where there is a database recording what applications have been installed in what device, and a corresponding status of each. The database is updated with the acknowledgement from the SE.

FIG. 2E shows a flowchart or process for disabling or locking an installed application. It is known to those skilled in the art that other operations, such as unlocking or enabling an installed application, extending expiration of an installed application, are similar to the one shown in FIG. 2E, and thus the flowcharts thereof are not provided herein.

Figure 2F:
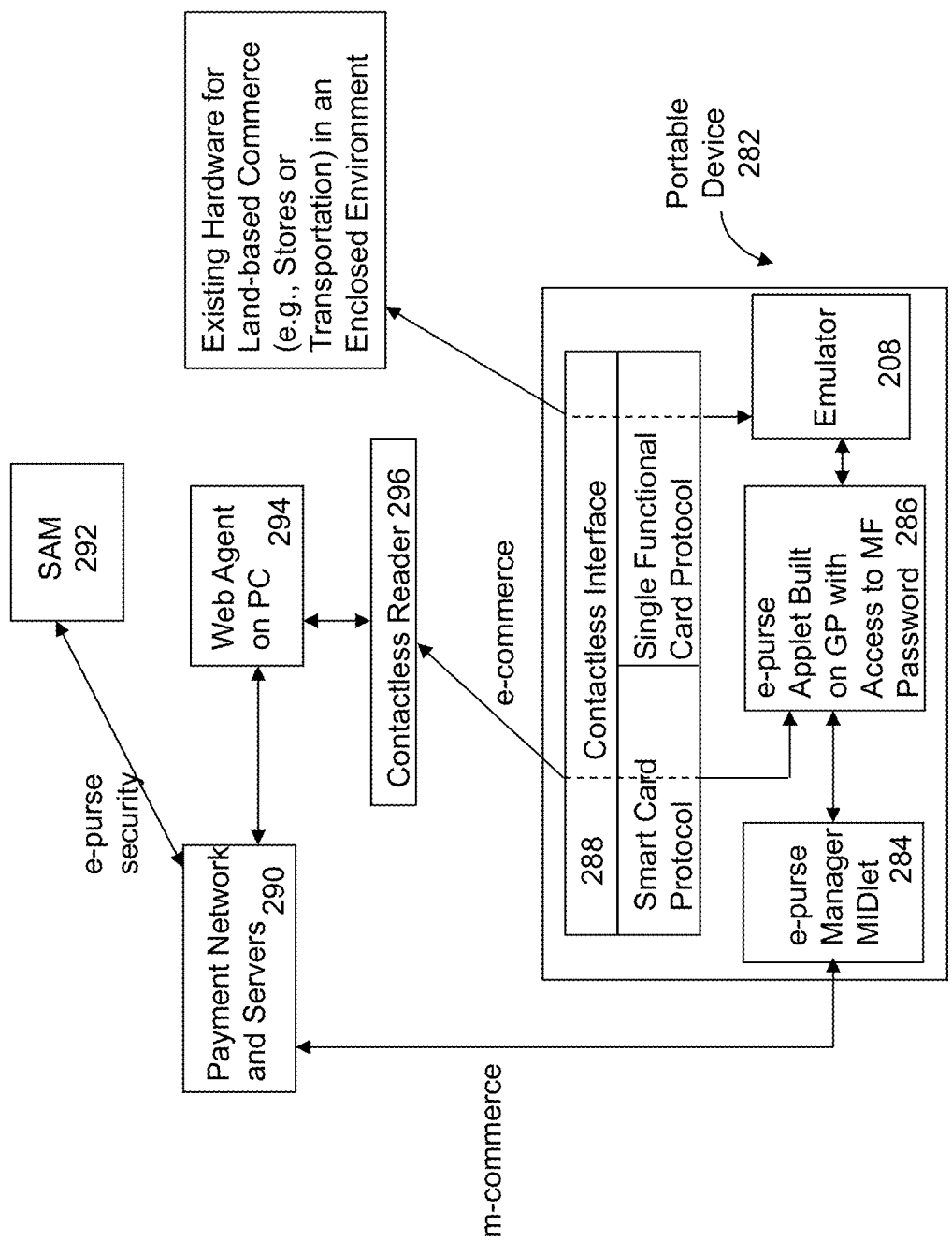
FIG. 2F shows an exemplary architecture diagram of a portable device enabled as an e-purse conducting e-commerce and m-commerce, according to one embodiment of the present invention.

Referring now to FIG. 2F, there shows an exemplary architecture diagram 280 of a portable device enabled as an electronic wallet or e-purse to facilitate e-commerce and m-commerce, according to one embodiment of the present invention. The diagram 280 includes a cell phone 282 embedded with a smart card module. An example of such a cell phone is a near field communication (NFC) enabled cellphone that includes a Smart MX (SMX) module. Not separately shown, there is an SE that has already personalized according to the process discussed above. An application to enable the device as e-purse has also been installed. Unless explicitly stated, the following description will not call out which part is performing the function of a secure element and which part is performing as an application. Those skilled in the art shall appreciate the proper parts or functions being performed given the detailed description herein.

The SMX is pre-loaded with a Mifare emulator 288 (which is a single functional card) for storing values. The portable phone is equipped with a contactless interface (e.g., ISO 14443 RFID) that allows the portable phone to act as a tag. In one embodiment, the SMX is a JavaCard that can run Java applets. The e-purse application is configured to be able to access the Mifare data structures with appropriate transformed passwords based on the access keys created when the SE is personalized.

In the portable phone 282, an e-purse manager MIDlet 204 is provided. For m-commerce, the MIDlet 284 acts as an agent to facilitate communications between an e-purse applet 286 and one or more payment network and servers 290 to conduct transactions therebetween. As used herein, a MIDlet is a software component suitable for being executed on a portable device. The e-purse manager MIDlet 284 is implemented as a "MIDlet" on a Java cell phone, or an "executable application" on a PDA device. One of the functions of the e-purse manager MIDlet 284 is to connect to a wireless network and communicate with an e-purse applet which can reside on either the same device or an external smart card. In addition, it is configured to provide administrative functions such as changing a PIN, viewing an e-purse balance and a transaction history log. In one application in which a card issuer provides a SAM 292 that is used to enable and authenticate any transactions between a card and a corresponding server (also referred to as a payment server). As shown in FIG. 2F, APDU commands are constructed by the servers 290 having access to a SAM 292, where the APDU is a communication unit between a reader and a card. The structure of an APDU is defined by the ISO 7816 standards in one embodiment. Typically, an APDU command is embedded in network messages and delivered to the server 290 or the e-purse applet 286 for processing.

For e-commerce, a web agent 294 on a computer (not shown) is responsible for interacting with a contactless reader (e.g., an ISO 14443 RFID reader) and the network server 290. In operation, the agent 294 sends the APDU commands or receives responses thereto through the contactless reader 296 to/from the e-purse applet 286 residing in the cell phone 282. On the other hand, the agent 294 composes network requests (such as HTTP) and receives responses thereto from the payment server 280.

To personalize or provision the portable phone 282, FIG. 3A shows a block diagram 300 of related modules interacting with each other to achieve what is referred to herein as e-purse personalization (or provisioning) by an authorized person. FIG. 3B shows a block diagram 320 of related modules interacting with each other to achieve what is referred to herein as e-purse personalization by a user of the e-purse as shown in FIG. 2F.

Figure 3C:
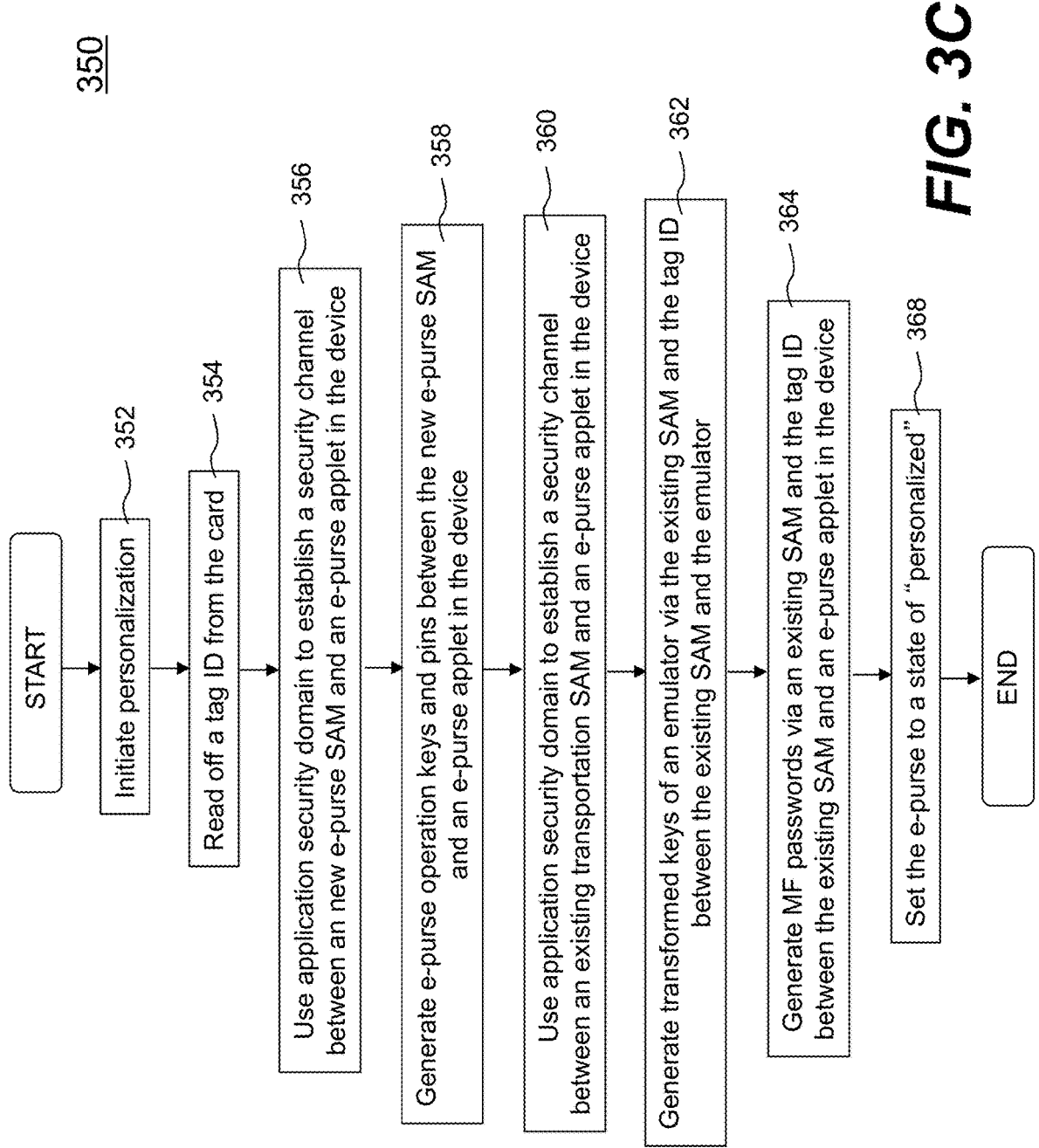
FIG. 3C shows a flowchart or process of personalizing an e-purse according to one embodiment of the present invention.

FIG. 3C shows a flowchart or process 350 of personalizing an e-purse applet according to one embodiment of the present invention. FIG. 3C is suggested to be understood in conjunction with FIG. 3A and FIG. 3B. The process 350 may be implemented in software, hardware or a combination of both.

As described above, an e-purse manager is built on top of the already-personalized SE to provide a security mechanism necessary to personalize the e-purse applet designed therefor. In operation, a security domain is used for establishing a secured channel between a personalization application server and the e-purse applet. According to one embodiment, the essential data to be personalized into the e-purse applet include one or more operation keys (e.g., a load or top-up key and a purchase key), default PINs, administration keys (e.g., an unblock PIN key and a reload PIN key), and passwords (e.g., from Mifare).

It is assumed that a user desires to personalize an e-purse applet embedded in a portable device (e.g., a cell phone). At 352 of FIG. 3C, a personalization process is initiated. Depending on implementation, the personalization process may be implemented in a module in the portable device and activated manually or automatically, or a physical process initiated by an authorized person (typically associated with a card issuer). As shown in FIG. 3A, an authorized personal initiates a personalization process 304 to personalize the e-purse applet for a user thereof via an existing new e-purse SAM 306 and an existing SAM 308 with the contactless reader 310 as the interface. The card manager 311 performs at least two functions: 1) establishing a security channel, via a security domain, to install and personalize an external application (e.g., e-purse applet) in the card personalization; and 2) creating security means (e.g., PINs) to protect the application during subsequent operations. As a result of the personalization process using the personalization application server 304, the e-purse applet 312 and the emulator 314 are personalized.

Similarly, as shown in FIG. 3B, a user of an e-purse desires to initiate a personalization process to personalize the e-purse applet wirelessly (e.g., via the m-commerce path of FIG. 2). Different from FIG. 3A, FIG. 3B allows the personalization process to be activated manually or automatically. For example, there is a mechanism on a cell phone that, if pressed, activates the personalization process. Alternatively, a status of "non-personalized" may prompt to the user to start the personalization process. As described above, a MIDlet 322 (i.e., a provisioning manager or a service manager) in a portable device acts as an agent to facilitate the communication between a payment server 324 and the e-purse applet 312 as well as the emulator 314, wherein the payment server 324 has the access to the existing new e-purse SAM 306 and an existing SAM 308. As a result of the personalization process, the e-purse applet 312 and the emulator 314 are personalized.

Referring now back to FIG. 3C, after the personalization process is started, in view of FIG. 3A, the contactless reader 310 is activated to read the tag ID (i.e., RFID tag ID) and essential data from a smart card in the device at 354. With an application security domain (e.g., a default security setting by a card issuer), a security channel is then established at 356 between a new e-purse SAM (e.g., the SAM 306 of FIG. 3A) and an e-purse applet (e.g., the e-purse 312 of FIG. 3A) in the portable device.

Each application security domain key set includes at least three (3) DES keys. For example:
Key1: 255/1/DES-ECB/ 404142434445464748494a4b4c4d4e4f
Key2: 255/2/DES-ECB/ 404142434445464748494a4b4c4d4e4f
Key3: 255/3/DES-ECB/ 404142434445464748494a4b4c4d4e4f A security domain is used to generate session keys for a secured session between two entities, such as the card manager applet and a host application, in which case the host application may be either a desktop personalization application or a networked personalization service provided by a backend server.

A default application domain can be installed by a card issuer and assigned to various application/service providers. The respective application owner can change the value of the key sets before the personalization process (or at the initial of the process). Then the application can use the new set to create a security channel for performing the personalization process.

With the security channel is established using the application provider's application security domain, the first set of data can be personalized to the e-purse applet. The second set of data can also be personalized with the same channel, too. However, if the data are in separate SAM, then a new security channel with the same key set (or different key sets) can be used to personalize the second set of data.

Via the new e-purse SAM 306, a set of e-purse operation keys and PINs are generated for data transactions between the new e-purse SAM and the e-purse applet to essentially personalize the e-purse applet at 358.

A second security channel is then established at 360 between an existing SAM (e.g., the SAM 308 of FIG. 3A) and the e-purse applet (e.g., the e-purse applet 312 of FIG. 3A) in the portable device. At 362, a set of transformed keys is generated using the existing SAM and the tag ID. The generated keys are stored in the emulator for subsequent data access authentication. At 358, a set of MF passwords is generated using the existing SAM and the tag ID, then is stored into the e-purse applet for future data access authentication. After it is done, the e-purse including the e-purse applet and the corresponding emulator is set to a state of "personalized".

Figure 4A:
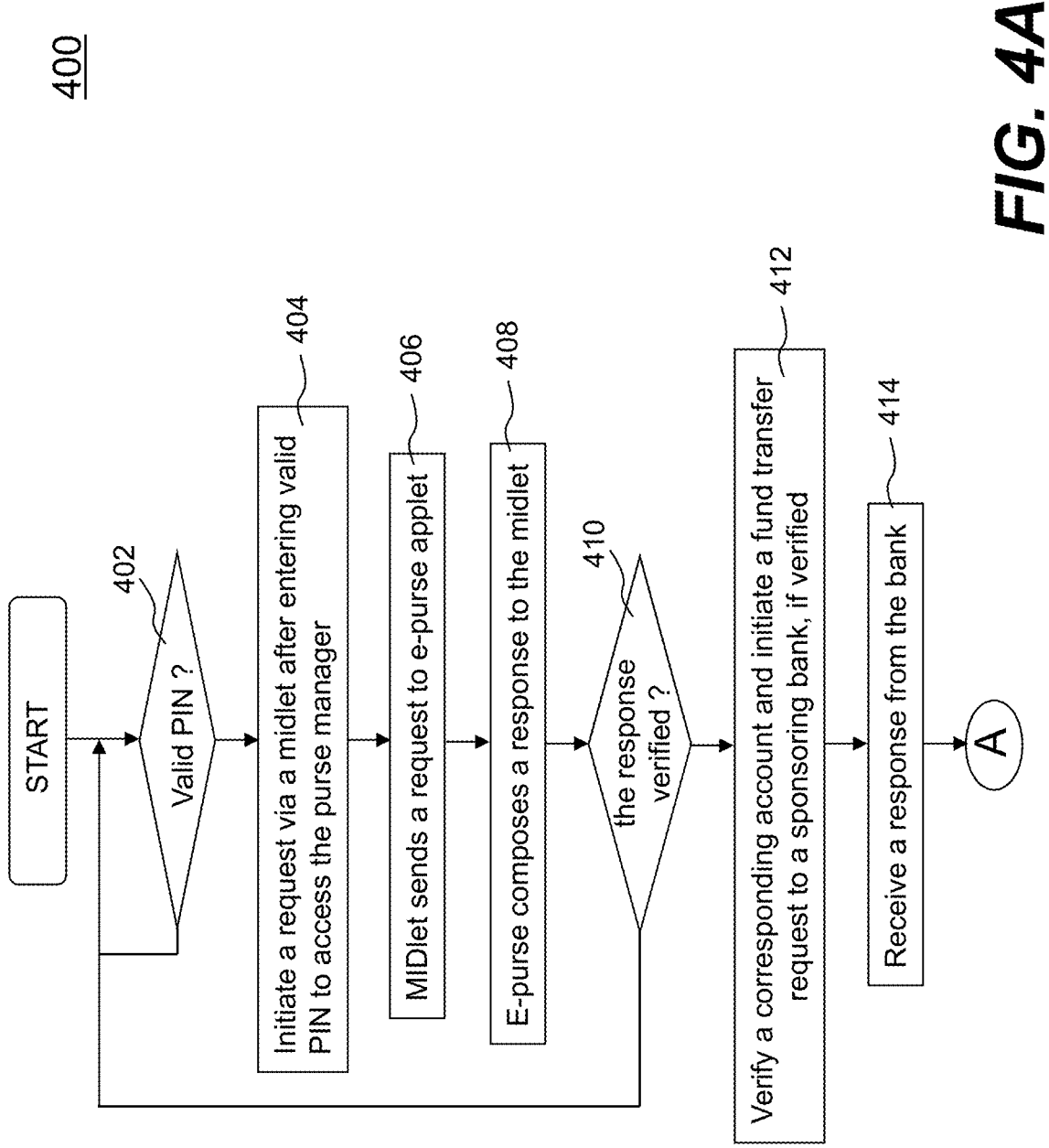
FIG. 4A and FIG. 4B show together a flowchart or process of financing, funding, load or top-up an e-purse according to one embodiment of the present invention.
Figure 4B:
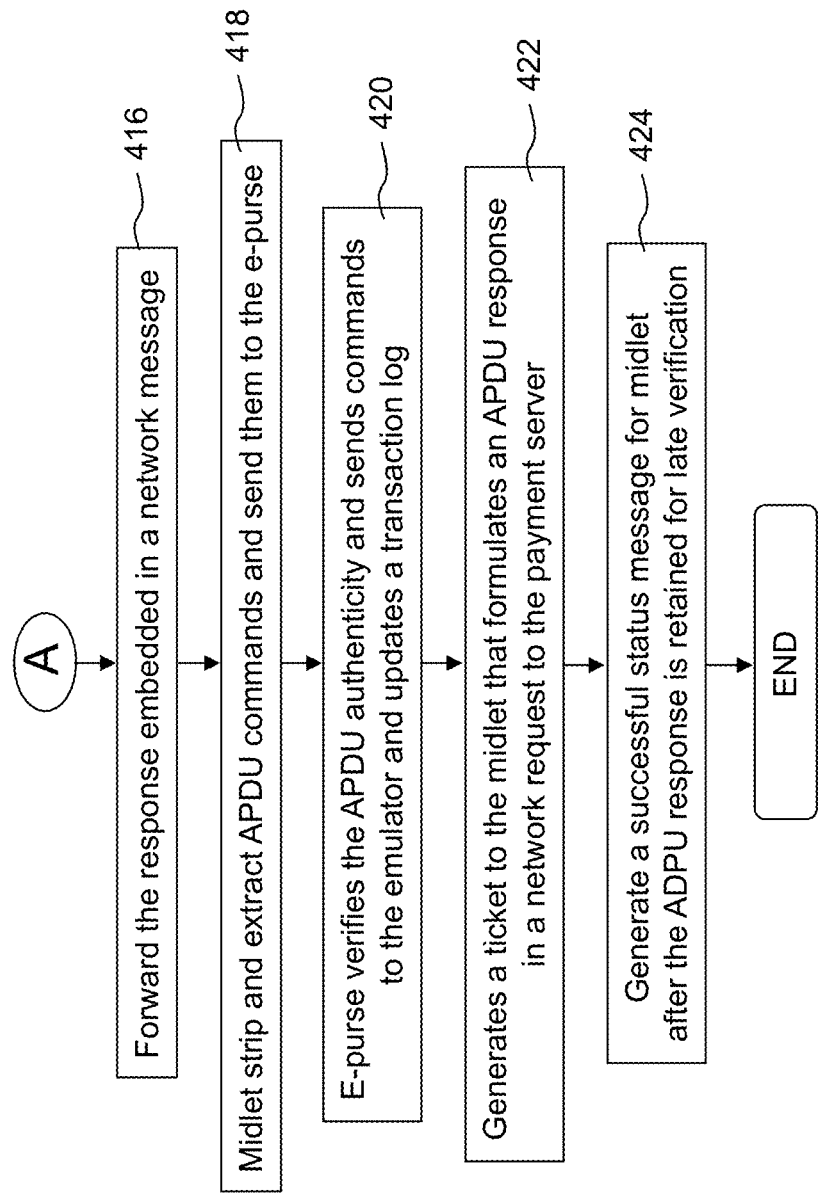
Figure 4C:
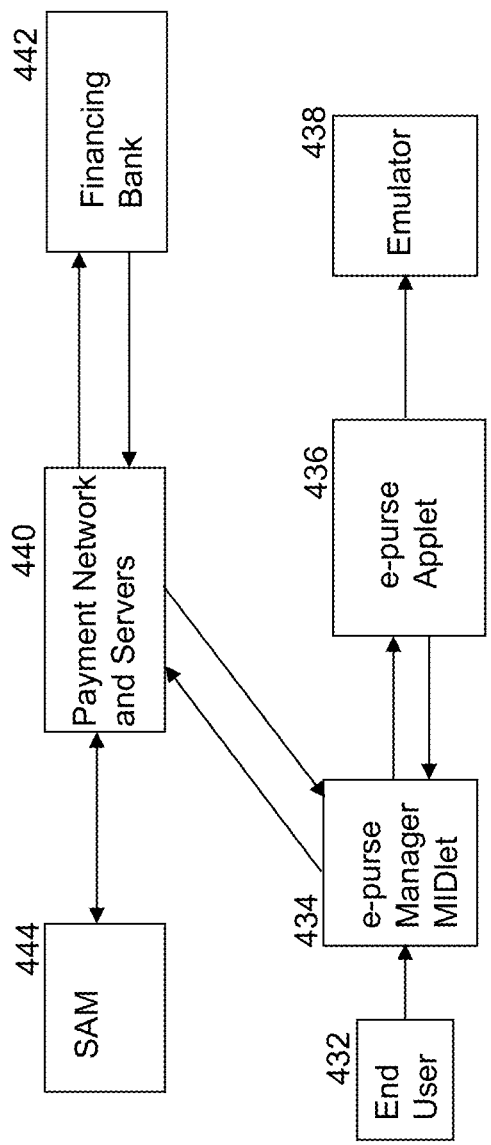
FIG. 4C shows an exemplary block diagram of related blocks interacting with each other to achieve the process FIG. 4A and FIG. 4B.

FIG. 4A and FIG. 4B show together a flowchart or process 400 of financing or funding an e-purse according to one embodiment of the present invention. The process 400 is conducted via the m-commerce path of FIG. 2. To better understand the process 400, FIG. 4C shows an exemplary block diagram 450 of related blocks interacting with each other to achieve the process 400. Depending on an actual application of the present invention, the process 400 may be implemented in software, hardware or a combination of both.

A user is assumed to have obtained a portable device (e.g., a cell phone) that is configured to include an e-purse. The user desires to fund the e-purse from an account associated with a bank. At 402, the user enters a set of personal identification numbers (PIN). Assuming the PIN is valid, an e-purse manger in the portable device is activated and initiates a request (also referred to an over-the-air (OTA) top-up request) at 404. The MIDlet in the portable device sends a request to the e-purse applet at 406, which is illustrated in FIG. 4C where the e-purse manager MIDlet 434 communicates with the e-purse applet 436.

At 408, the e-purse applet composes a response in responding to the request from the MIDlet. Upon receiving the response, the MIDlet sends the response to a payment network and server over a cellular communications network. As shown in FIG. 4C, the e-purse manager MIDlet 434 communicates with the e-purse applet 436 for a response that is then sent to the payment network and server 440. At 410, the process 400 needs to verify the validity of the response. If the response cannot be verified, the process 400 stops. If the response can be verified, the process 400 moves to 412 where a corresponding account at a bank is verified. If the account does exist, a fund transfer request is initiated. At 414, the bank receives the request and responds to the request by returning a response. In general, the messages exchanged between the payment network and server and the bank are compliant with a network protocol (e.g., HTTP for the Internet).

At 416, the response from the bank is transported to the payment network and server. The MIDlet strips and extracts the APDU commands from the response and forwards the commands to the e-purse applet at 418. The e-purse applet verifies the commands at 420 and, provided they are authorized, sends the commands to the emulator at 420 and, meanwhile updating a transaction log. At 422, a ticket is generated to formulate a response (e.g., in APDU format) for the payment server. As a result, the payment server is updated with a successful status message for the MIDlet, where the APDU response is retained for subsequent verification at 424.

As shown in FIG. 4C, the payment network and server 440 receives a response from the e-purse manager MIDlet 434 and verifies that the response is from an authorized e-purse applet 436 originally issued therefrom with a SAM 444. After the response is verified, the payment network and server 440 sends a request to the financing bank 442 with which the user 432 is assumed to maintain an account. The bank will verify the request, authorize the request, and return an authorization number in some pre-arranged message format. Upon receiving the response from the bank 442, the payment server 440 will either reject the request or accept the request by forming a network response sent to the MIDlet 434.

The e-purse manager 434 verifies the authenticity (e.g., in APDU format) and sends commands to the emulator 438 and updates the transaction logs. By now, the e-purse applet 436 finishes the necessary steps and returns a response to the MIDlet 434 that forwards an (APDU) response in a network request to the payment server 440.

Although the process 400 is described as funding the e-purse. Those skilled in the art can appreciate that the process of making purchasing over a network with the e-purse is substantially similar to the process 400, accordingly no separate discussion on the process of making purchasing is provided.

Figure 5A:
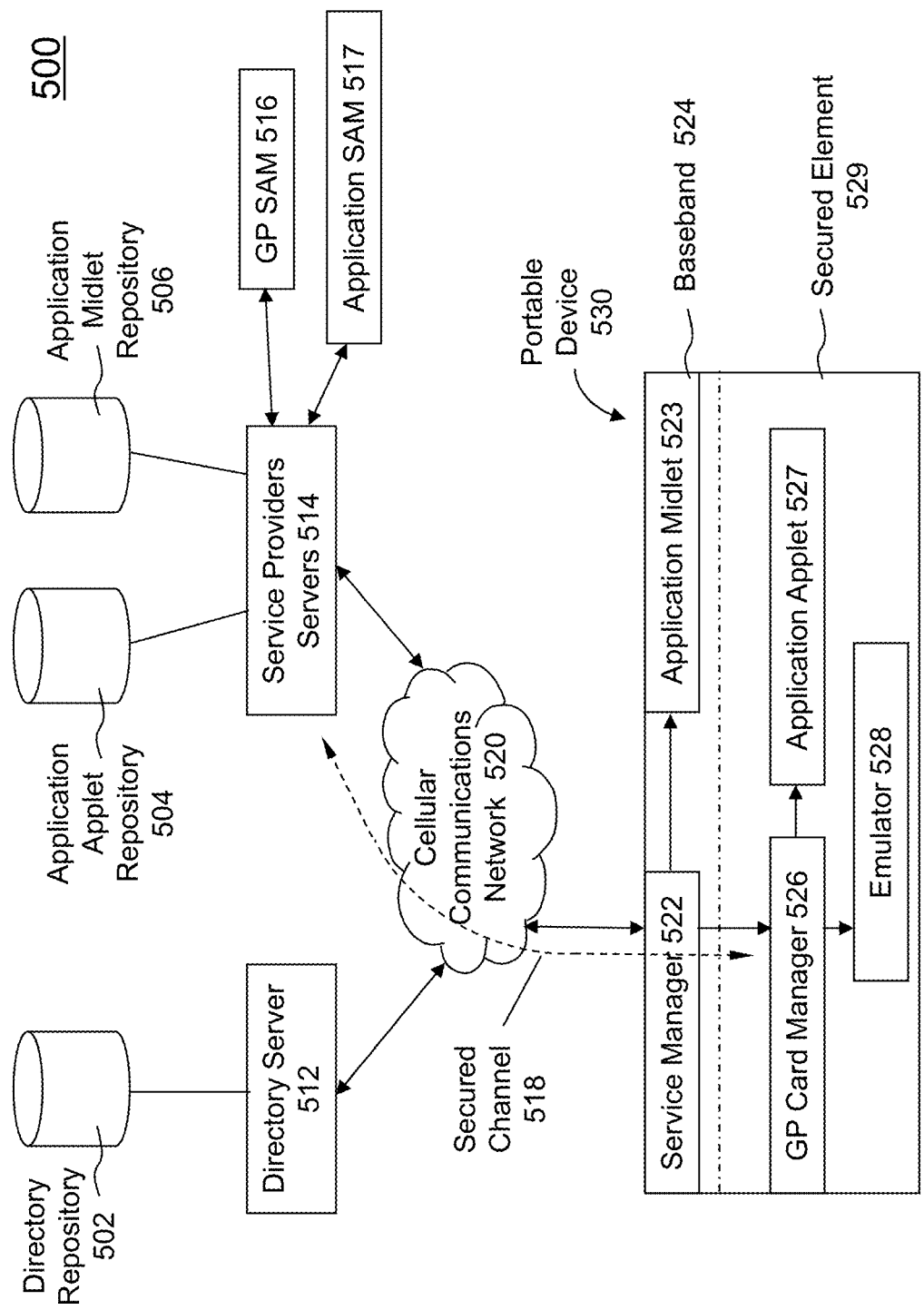
FIG. 5A is a diagram showing a first exemplary architecture of a portable device for enabling e-commerce and m-commerce functionalities over a cellular communications network (i.e., 3G, LTE or GPRS network), according an embodiment of the present invention.

Referring to FIG. 5A, there is shown a first exemplary architecture 500 of enabling a portable device 530 for e-commerce and m-commerce over a cellular communications network 520 (e.g., a GPRS network) in accordance with one embodiment of the present invention. The portable device 530 comprises a baseband 524 and a secured element 529 (e.g., a smart card). One example of such portable device is a Near Field Communication (NFC) enabled portable device (e.g., a cell mobile phone or a PDA). The baseband 524 provides an electronic platform or environment (e.g., a Java Micro Edition (JME), or Mobile Information Device Profile (MIDP)), on which an application MIDlet 523 and a service manager 522 can be executed or run. The secured element 529 contains a global platform (GP) card manager 526, an emulator 528 and other components such as PIN manager (not shown), wherein the global platform is an independent, not-for-profit organization concerned with a standardized infrastructure for development, deployment and management of smart cards.

To enable the portable device 530 to conduct e-commerce and m-commerce, one or more services/applications need to be pre-installed and pre-configured thereon. An instance of a service manager 522 (e.g., a MIDlet with GUI) needs to be activated. In one embodiment, the service manager 522 is downloaded and installed. In another embodiment, the service manager 522 is preloaded. In any case, once the service manager 522 is activated, a list of directories for various services is shown. The items in the list may be related to the subscription by a user, and may also include items in promotion independent of the subscription by the user. The directory list may be received from a directory repository 502 of a directory server 512. The directory server 512 acts as a central hub (i.e., yellow page functions) for different service providers (e.g., an installation server, a personalization server) that may choose to offer products and/or services to subscribers. The yellow page functions of the directory server 512 may include service plan information (e.g., service charge, start date, end date, etc.), installation, personalization and/or MIDlet download locations (e.g., Internet addresses). The installation and personalization may be provided by two different business entities. For example, the installation is provided by an issuer of a secured element 529, while the personalization may be provided by a service provider who holds application transaction keys for a particular application.

According to one embodiment, the service manager 522 is configured to connect to one or more servers 514 (e.g., a TSM server) from a service provider(s) over the cellular communications network 520. It is assumed that the user has chosen one of the applications from the displayed directory. A secured channel 518 is established between the one or more servers 514 and the GP manager 526 to install/download an application applet 527 selected by the user and then to personalize the application applet 527 and optionally emulator 528, and finally to download an application MIDlet 523. The applet repository 504 and MIDlet repository 506 are the sources of generic application applets and application MIDlets, respectively. GP SAM 516 and application SAM 517 are used for creating the secured channel 518 for the personalization operations.

Figure 5B:
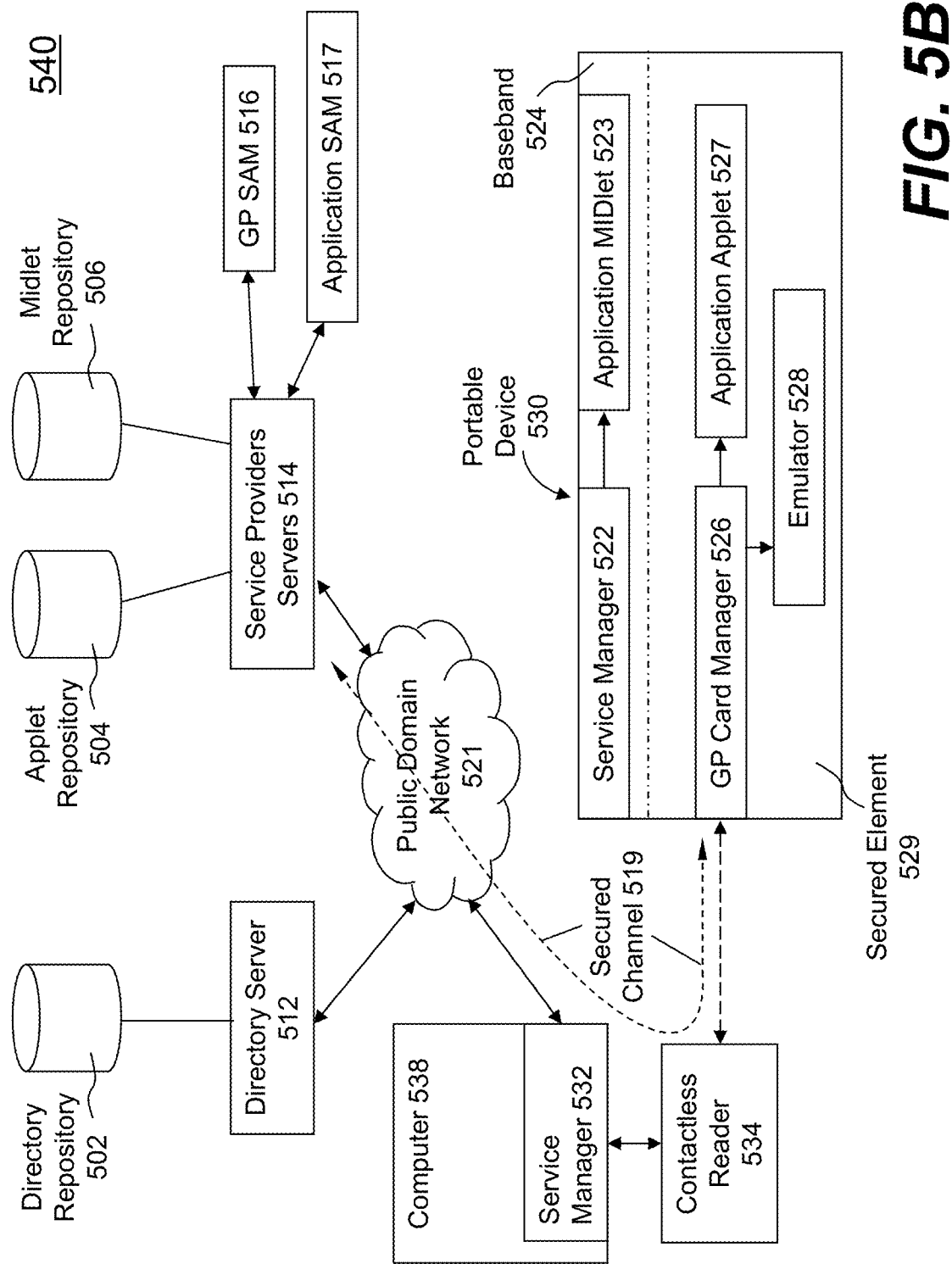
FIG. 5B is a diagram showing a second exemplary architecture of a portable device for enabling e-commerce and m-commerce functionalities over a wired and/or wireless data network (e.g., Internet), according another embodiment of the present invention.

FIG. 5B is a diagram showing a second exemplary architecture 540 of enabling a portable device 530 for e-commerce and m-commerce over a public network 521, according to another embodiment of the present invention. Most of the components of the second architecture 540 are substantially similar to those of the first architecture 500 of FIG. 5A. While the first architecture 500 is based on operations over a cellular communications network 520, the public network 521 (e.g., Internet) is used in the second architecture 540. The public network 521 may include a local area network (LAN), a wide area network (WAN), a Wi-Fi (IEEE 802.11) wireless link, a Wi-Max (IEEE 802.16) wireless link, etc. In order to conduct service operations over the public network 521, an instance of the service manager 532 (i.e., same or similar functionality of the service manager MIDlet 522) is installed on a computer 538, which is coupled to the public network 521. The computer 538 may be a desktop personal computer (PC), a laptop PC, or other computing devices that can execute the instance of the service manager 532 and be connected to the public network 521. The connection between the computer 538 and the portable device 530 is through a contactless reader 534. The service manager 532 acts as an agent to facilitate the installation and personalization between one or more servers 514 of a service provider and a GP card manager 526 via a secured channel 519.

FIG. 5C is a flowchart illustrating a process 550 of enabling a portable device for e-commerce and m-commerce functionalities in accordance with one embodiment of the present invention. The process 550 may be implemented in software, hardware or a combination of both depending on implementation. To better understand the process 500, previous figures especially FIG. 5A and FIG. 5B are referred to in the following description.

Before the process 550 starts, an instance of a service manager 522 or 532 has been downloaded or pre-installed on either the portable device 530 or a computer 538. At 552, the service manager is activated and sends a service request to the server 514 at a service provider. Next after the authentication of a user and the portable device has been verified, at 554, the process 550 provides a directory list of services/applications based on subscription of the user of the portable device 530. For example, the list may contain a mobile POS application, an e-purse application, an e-ticketing application, and other commercially offered services. Then one of the services/applications is chosen from the directory list. For example, an e-purse or a mobile-POS may be chosen to configure the portable device 530. Responding to the user selection, the process 550 downloads and installs the selected services/applications at 556. For example, e-purse applet (i.e., application applet 527) is downloaded from the applet repository 504 and installed onto a secured element 529. The path for downloading or installation may be either via a secured channel 518 or 519. At 558, the process 550 personalizes the downloaded application applet and the emulator 528 if needed. Some of the downloaded application applets do not need to be personalized and some do. In one embodiment, a mobile POS application applet ("POS SAM") needs to be personalized, and the following information or data array has to be provided:

- a unique SAM ID based on the unique identifier of the underlying secured element;
- a set of debit master keys;
- a transformed message encryption key;
- a transformed message authentication key;
- a maximum length of remark for each offline transaction;
- a transformed batch transaction key; and
- a GP PIN.

In another embodiment, personalization of an e-purse applet for a single functional card not only needs to configure specific data (i.e., PINs, transformed keys, start date, end date, etc.) onto the e-purse, but also needs to configure the emulator to be operable in an open system. Finally, at 560, the process 550 downloads and optionally launches the application MIDlet 523. Some of the personalized data from the application applet may be accessed and displayed or provided from the user. The process 550 ends when all of the components of services/applications have been installed, personalized and downloaded.

According to one embodiment, an exemplary process of enabling a portable device 530 as a mobile POS is listed as follows:

- connecting to an installation server (i.e., one of the service provider server 514) to request the server to establish a first security channel (e.g., the secured channel 518) from an issuer domain (i.e., applet repository 504) to the GP card manager 526 residing in a secured element 529;
- receiving one or more network messages including APDU requests that envelop a POS SAM applet (e.g., a Java Cap file from the applet repository 504);
- extracting the APDU requests from the received network messages;
- sending the extracted APDU requests to the GP card manager 526 in a correct order for installation of the POS SAM (i.e., application applet 527) onto the secured element 529;
- connecting to a personalization server (i.e., one of the service provider servers 514) for a second security channel (may or may not be the secured channel 518 depending on the server and/or the path) between the personalization server and the newly downloaded applet (i.e., POS SAM);
- receiving one or more network messages for one or more separated 'STORE DATA APDU'; and
- extracting and sending the 'STORE DATA APDU' to personalize POS SAM; and
- downloading and launching POS manager (i.e., application MIDlet 523).

Figure 6A:
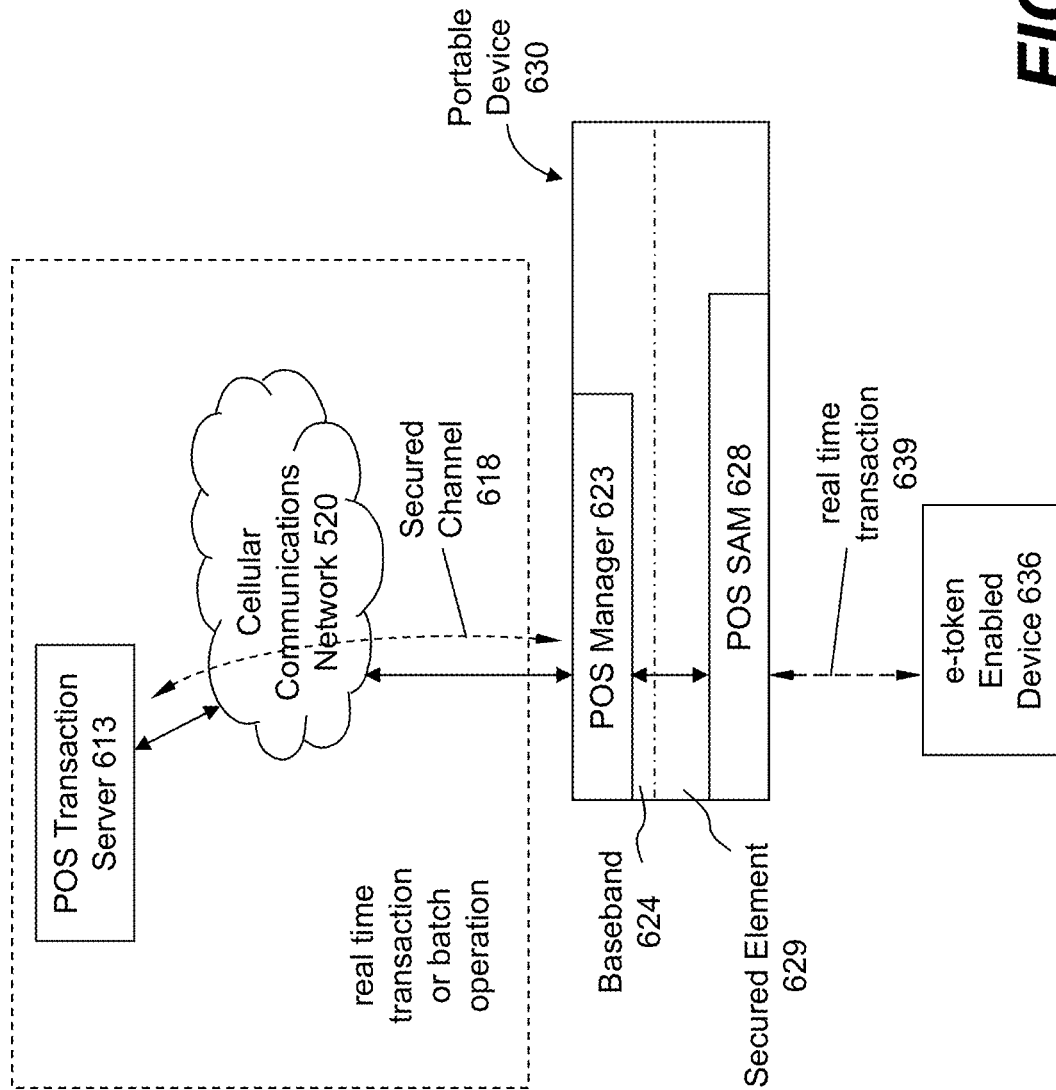
FIG. 6A is a diagram showing an exemplary architecture, in which a portable device is enabled as a mobile POS conducting e-commerce and m-commerce, according to one embodiment of the present invention.

Referring to FIG. 6A, there is shown an exemplary architecture 600, in which a portable device 630 is enabled as a mobile POS to conduct e-commerce and m-commerce, according to one embodiment of the present invention. The portable device 630 comprises a baseband 624 and a secured element 629. A POS manager 623 is downloaded and installed in the baseband 623 and a POS SAM 628 is installed and personalized in the secured element 629 to enable the portable device 630 to act as a mobile POS. Then a real time transaction 639 can be conducted between the mobile POS enabled portable device 630 and an e-token enabled device 636 (e.g., a single functional card or a portable device enabled with an e-purse). The e-token may represent e-money, e-coupon, e-ticket, e-voucher or any other forms of payment tokens in a device.

The real time transaction 639 can be conducted offline (i.e., without the portable device connecting to a backend POS transaction server 613). However, the portable device 630 may connect to the backend POS transaction servers 613 over the cellular network 520 in certain instances, for example, the amount of the transaction is over a pre-defined threshold or limit, the e-token enabled device 636 needs a top-up or virtual top-up, transactional upload (single or in batch).

Records of accumulated offline transactions need to be uploaded to the backend POS transaction server 613 for settlement. The upload operations are conducted with the portable device 630 connecting to the POS transaction server 613 via a secured channel 618. Similar to the installation and personalization procedures, the upload operations can be conducted in two different routes: the cellular communications network 520; or the public network 521. The first route has been described and illustrated in FIG. 6A.

Figure 6B:
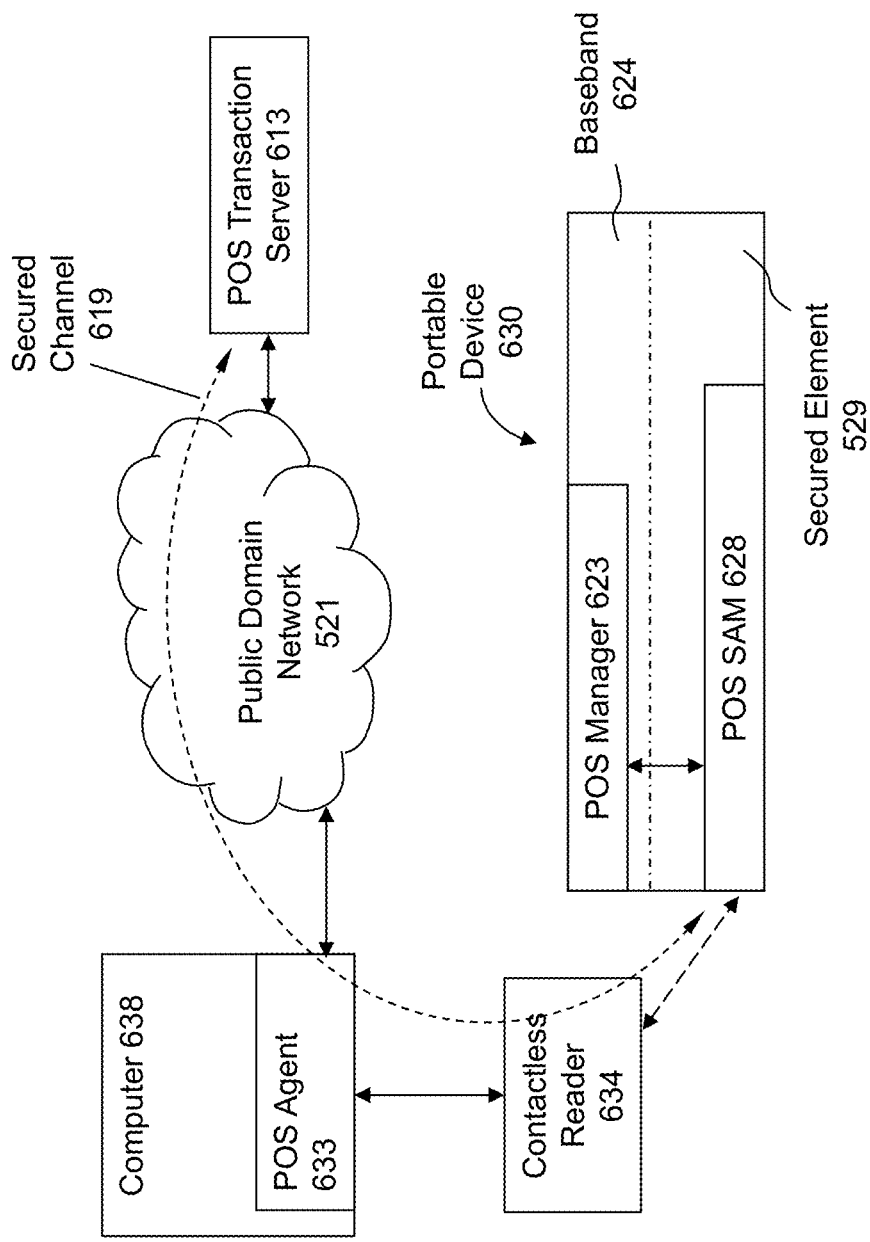
FIG. 6B is a diagram showing an exemplary architecture, in which a portable device is enabled as a mobile POS conducting a transaction upload operation over a network, according to an embodiment of the present invention.

The second route is illustrated in FIG. 6B showing an exemplary architecture 640, in which a portable device 630 is enabled as a mobile POS conducting a transaction upload in batch operation over a public network 521, according to an embodiment of the present invention. Records of offline transactions in the mobile POS are generally kept and accumulated in a transaction log in the POS SAM 628. The transaction log are read by a contactless reader 634 into a POS agent 633 installed on a computer 638. The POS agent 633 then connects to a POS transaction server 613 over the public network 521 via a secured channel 619. Each of the upload operations is marked as a different batch, which includes one or more transaction records. Data communication between the POS SAM 628, the contactless reader 634 and the POS agent 632 in APDU containing the transaction records. Network messages that envelop the APDU (e.g., HTTP) are used between the POS agent 632 and the POS transaction server 613.

In one embodiment, an exemplary batch upload process from the POS manager 623 or the POS agent 633 includes:

- sending a request to the POS SAM 628 to initiate a batch upload operation;
- retrieving accumulated transaction records in form of APDU commands from a marked "batch" or "group" in the POS SAM 628 when the POS SAM 628 accepts the batch upload request;
- forming one or more network messages containing the retrieved APDU commands;
- sending the one or more network messages to the POS transaction server 613 via a secured channel 619;
- receiving a acknowledgement signature from the POS transaction server 613;

forwarding the acknowledgement signature in form APDU to the POS SAM 628 for verification and then deletion of the confirmed uploaded transaction records; and repeating the step b) to step f) if there are additional un-uploaded transaction records still in the same "batch" or "group".

Figure 6C:
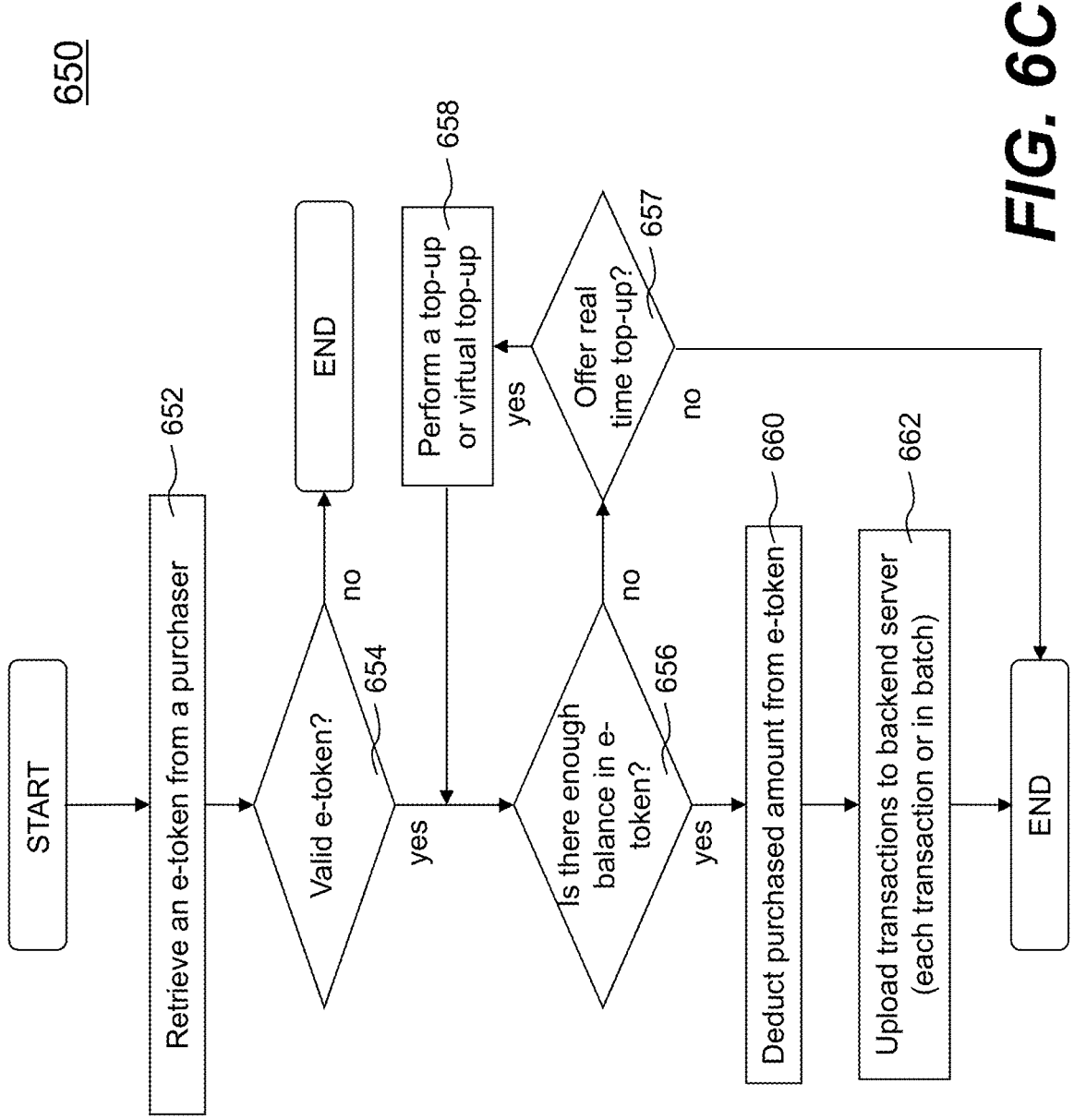
FIG. 6C is a flowchart illustrating an exemplary process of conducting m-commerce using the portable device enabled as a mobile POS with an e-token enabled device as a single functional card in accordance with one embodiment of the present invention.

Referring to FIG. 6C, there is shown a flowchart illustrating a process 650 of conducting m-commerce using the portable device 630 enabled to act as a mobile POS with an e-token enabled device 636 as a single functional card in accordance with one embodiment of the present invention. The process 650, which is preferably understood in conjunction with the previous figures especially FIG. 6A and FIG. 6B, may be implemented in software, hardware or a combination of both.

The process 650 (e.g., a process performed by the POS manager 623 of FIG. 6A) starts when a holder of an e-token enabled device (e.g., a Mifare card or an e-purse enabled cell phone emulating single functional card) desires to make a purchase or order a service with the mobile POS (i.e., the portable device 630). At 652, the portable device 630 retrieving an e-token (e.g., tag ID of Mifare card) by reading the e-token enabled device. Next, the process 650 verifies whether the retrieved e-token is valid at 654. If the e-token enabled device 636 of FIG. 6A is a single functional card (e.g., Mifare), the verification procedure performed by the POS manager 623 includes: i) reading the card identity (ID) of the card stored on an area that is unprotected or protected by a well-known key; ii) sending an APDU request containing the card ID to the POS SAM 628; iii) and receiving one or more transformed keys (e.g., for transaction counter, an issuer data, etc.) generated by the POS SAM 628. If the one or more received transformed keys are not valid, that is, the retrieved e-token being not valid, then the process 650 ends. Otherwise, the process 650 following the "yes" branch to 656, in which it is determined whether there is enough balance in the retrieved e-token to cover the cost of the current transaction. If the result is "no" at 656, the process 650 may optionally offer the holder to top-up (i.e., load, fund, finance) the e-token at 657. If "no", the process 650 ends. Otherwise if the holder agrees to a real time top-up of the e-token enabled device, the process 650 performs either a top-up or a virtual top-up operation at 658. Then the process 650 goes back to 656. Whereas there is enough balance in the e-token, the process 650 deducts or debits the purchase amount from the e-token of the e-token enabled device 636 at 660. In the single functional card case, the one or more transformed keys are used to authorize the deduction. Finally at 662, records of one or more offline transactions accumulated in the POS SAM 628 are uploaded to the POS transaction server 613 for settlement. The upload operations may be conducted for each transaction or in batch over either the cellular communications network 520 or the public domain network 521.

The top-up operations have been described and shown in the process 400 of FIG. 4A. A virtual top-up operation is a special operation of the top-up operation and typically is used to credit an e-token by a sponsor or donor. To enable a virtual top-up operation, the sponsor needs to set up an account that ties to an e-token enabled device (e.g., a single functional card, a multi-functional card, an e-token enable cell phone, etc.). For example, an online account is offered by a commercial entity (e.g., business, bank, etc.). Once the sponsor has funded the e-token to the online account, the holder of the e-token enabled device is able to receive an e-token from the online account when connecting to the mobile POS. Various security measures are implemented to ensure the virtual top-up operation is secure and reliable. One exemplary usage of the virtual top-up is that a parent (i.e., a sponsor) can fund an e-token via an online account, which is linked to a cell phone (i.e., an e-token enabled device) of a child (i.e., the holder), such that the child may receive the funded e-token while the child makes a purchase at a mobile POS. In addition to various e-commerce and m-commerce functionalities described herein, the POS manager 623 is configured to provide various query operations, for example, a) checking the un-batched (i.e., not uploaded) balance accumulated in the POS SAM, b) listing the un-batched transaction log in the POS SAM, c) viewing details of a particular transaction stored in the POS SAM, d) checking the current balance of an e-token enabled device, e) listing a transaction log of the e-token enabled device, and f) viewing details of a particular transaction of the e-token enabled device.

Figure 6D:
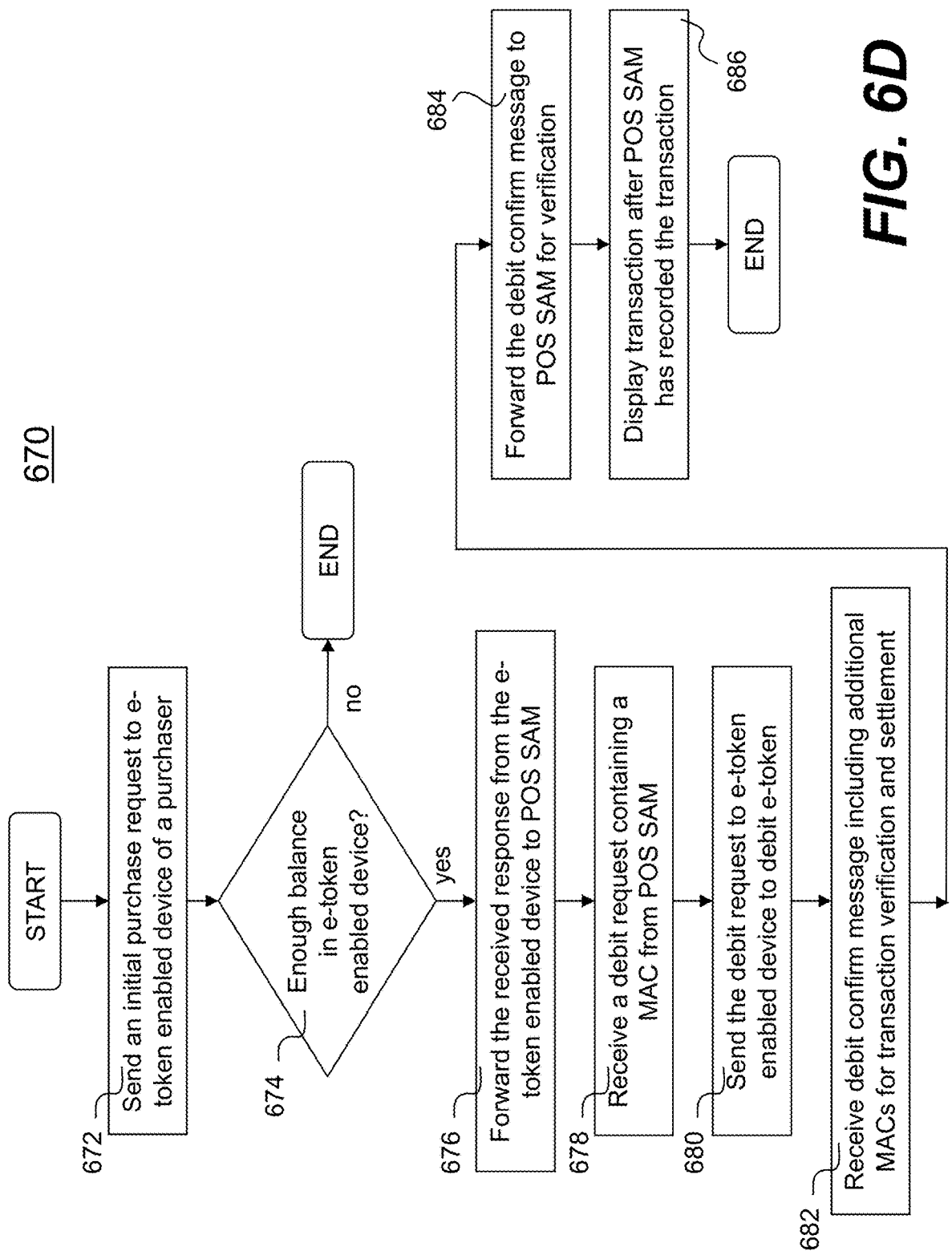
FIG. 6D is a flowchart illustrating an exemplary process of conducting m-commerce using the portable device enabled as a mobile POS against a an e-token enabled device as a multi-functional card.

Referring to FIG. 6D, there is shown a flowchart illustrating an exemplary process 670 of conducting m-commerce using the portable device 630 enabled to act as a mobile POS with an e-token enabled device 636 as a multi-functional card in accordance with one embodiment of the present invention. The process 670, which is preferably understood in conjunction with the previous figures especially FIG. 6A and FIG. 6B, may be implemented in software, hardware or a combination of both.

The process 670 (e.g., a process performed by the POS manager 623 of FIG. 6A) starts when a holder of an e-token enabled device 636 (e.g., a multi-functional card or an e-purse enabled cell phone emulating a multi-functional card) desires to make a purchase or order a service with the mobile POS (i.e., the portable device 630). At 672, the process 670 sends an initial purchase request to the e-token enabled device 636. The purchase amount is sent along with the initial request (e.g., APDU commands). Next the process 670 moves to decision 674. When there is not enough balance in the e-token enabled device 636. The initial purchase request will be turned down as a return message received at the POS manager 623. As a result, the process 670 ends with the purchase request being denied. If there is enough balance in the e-token enabled device 636, the result of the decision 674 is "yes" and the process 670 follows the "yes" branch to 676. The received response (e.g., APDU commands) from the e-token enabled device 636 is forwarded to the POS SAM 628. The response comprises information such as the version of the e-token key and a random number to be used for establishing a secured channel between the applet (e.g., e-purse applet) resided on the e-token enabled device 636 and the POS SAM 628 installed on the portable device 630. Then, at 678, the process 670 receives a debit request (e.g., APDU commands) generated by the POS SAM 628 in response to the forwarded response (i.e., the response at 676). The debit request contains a Message Authentication Code (MAC) for the applet (i.e., e-purse applet) to verify the upcoming debit operation, which is performed in response to the debit request sent at 680. The process 670 moves to 682 in which a confirmation message for the debit operation is received. In the confirmation message, there are additional MACs, which are used for verification and settlement by the POS SAM 628 and the POS transaction server 613, respectively. Next at 684, the debit confirmation message is forwarded to the POS SAM 628 for verification. Once the MAC is verified and the purchase transaction is recorded in the POS SAM 628, the recorded transaction is displayed at 686 before the process 670 ends. It is noted that the e-commerce transaction described may be carried out offline or online with the POS transaction server 613. Also when there is not enough balance in the e-token enabled device, a top-up or funding operation may be performed using the process 400 illustrated in FIG. 4A and FIG. 4B.

Figure 7:
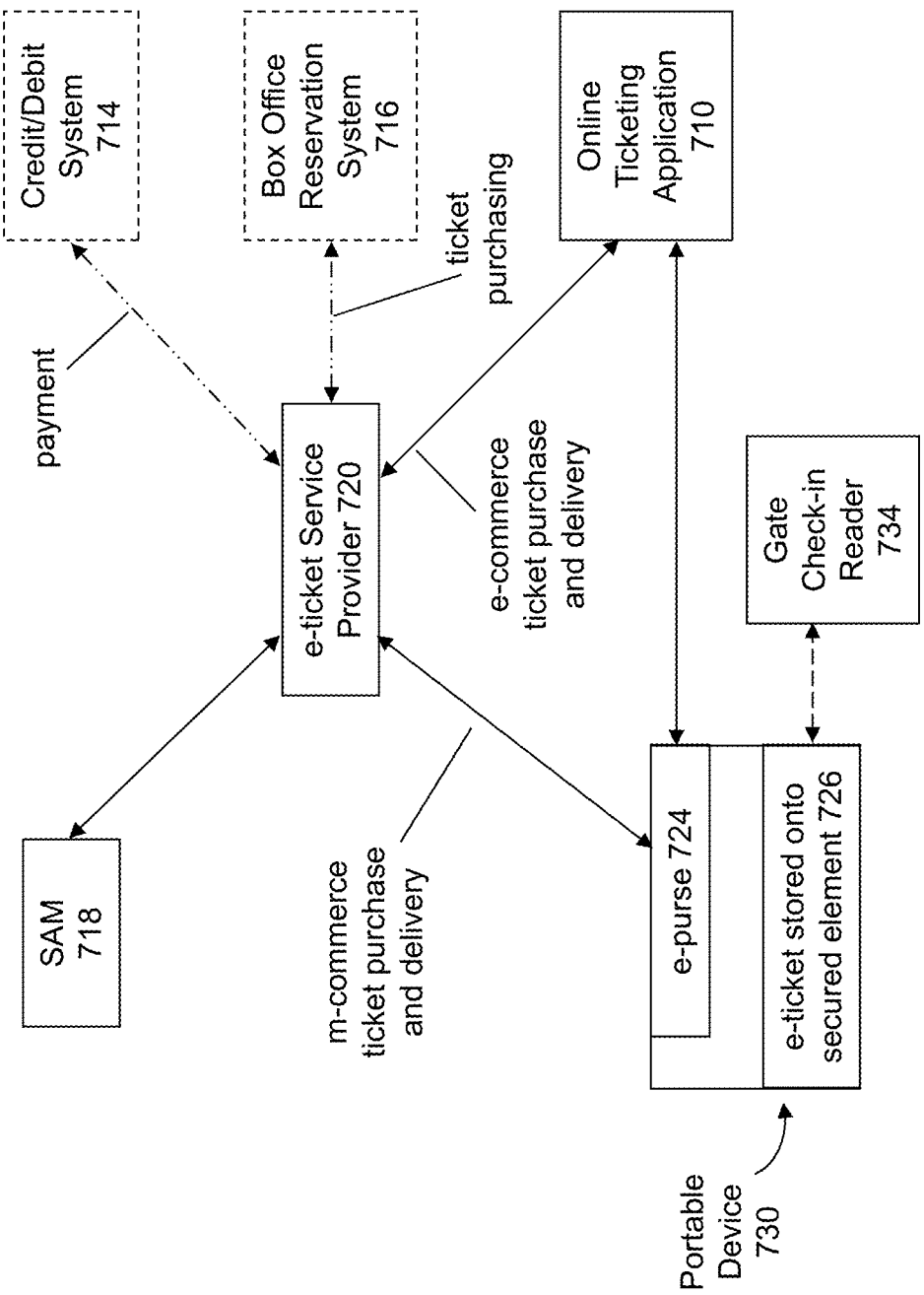
FIG. 7 is a diagram depicting an exemplary configuration in which a portable device used for an e-ticking application.

FIG. 7 shows an exemplary configuration in which a portable device is used for an e-ticketing application. A portable device 730 is configured to include an e-purse 724. When an owner or holder of the portable device 730 desires to purchase a ticket for a particular event (e.g., a concert ticket, a ballgame ticket, etc.), the owner can use e-purse 724 to purchase a ticket through an e-ticket service provider 720. The e-ticket service provider 720 may contact a traditional box office reservation system 716 or an online ticketing application 710 for ticket reservation and purchase. Then e-token (e.g., e-money) is deducted from the e-purse 724 of the portable device 730 to pay the ticket purchase to a credit/debit system 714 (e.g., a financial institute, a bank). A SAM 718 is connected to the e-ticket service provider 720 so that the authentication of e-purse 724 in the portable device 730 can be assured. Upon a confirmation of the payment is received, the e-ticket is delivered to the portable device 730 over the air (e.g., a cellular communications network) and stored onto a secured element 726 electronically, for example, an e-ticket code or key or password. Later on, when the owner of the portable device 730, the ticket holder, attends the particular event, the owner needs only to let a gate check-in reader 734 to read the stored e-ticket code or key in the portable device 730. In one embodiment, the gate check-in reader 734 is a contactless reader (e.g., an ISO 14443 complied proximity coupling device). The portable device 730 is a NFC capable mobile phone.

Figure 8A:
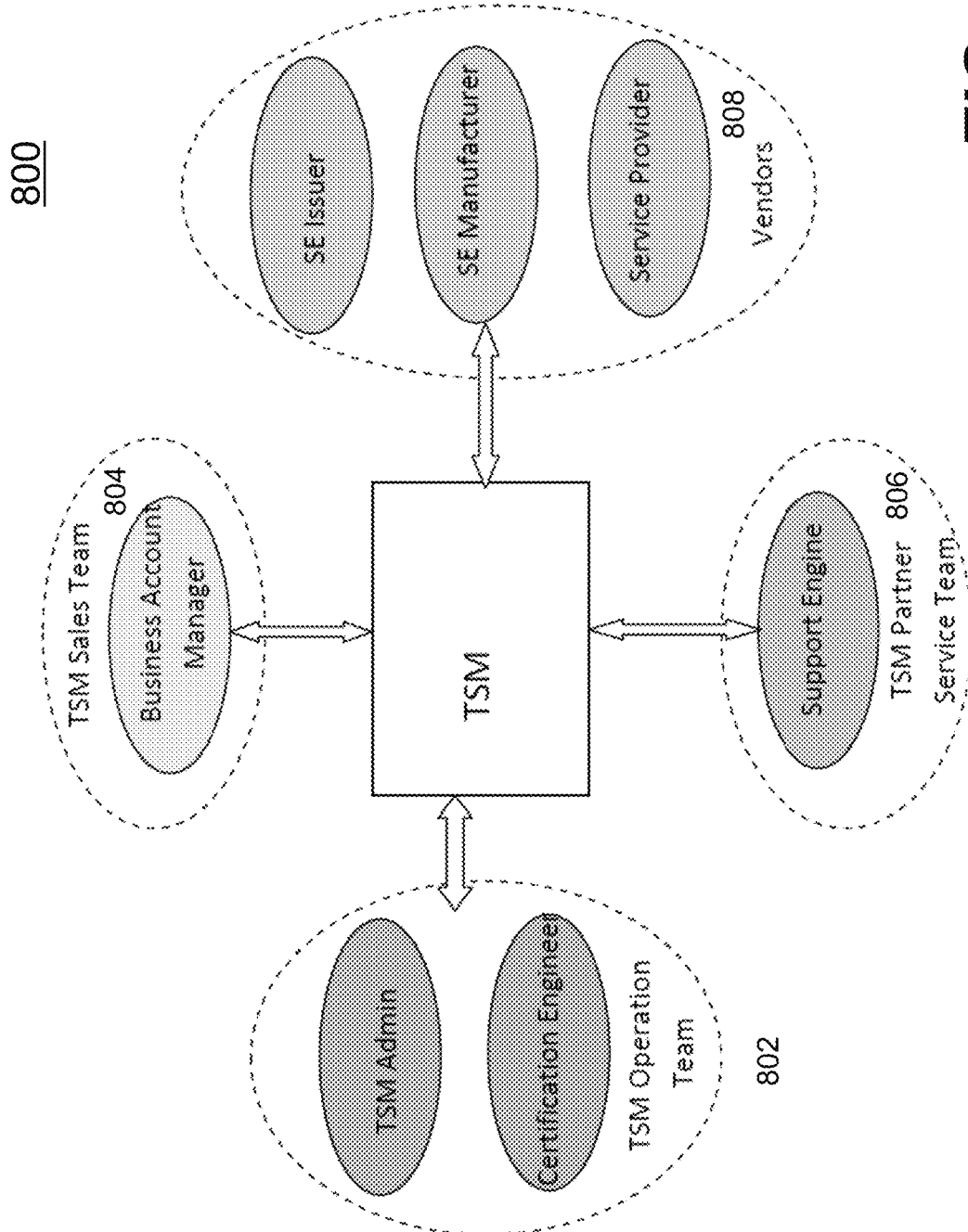
FIG. 8A shows a diagram of multiple parties involved in a TSM operated and orchestrated by a business.

Referring now to FIG. 8A, it shows a diagram of multiple parties involved in a TSM operated and orchestrated by a business according to one embodiment. A TSM operation team 802 includes an administration responsible for managing accounts for users that have personalized their SEs via the TSM and other tasks. In one embodiment, the TSM operation team 802 includes someone for managing the accounts and someone for managing system resources, such as managing HSM, creating HSM indices and GP keyset mapping. In addition, the team is responsible for offline importing default ISD info from one or more SE manufacturers. The team may also include someone referred to as a certification engineer responsible to collaborate with service providers and the SE issuers on application approval process. The TSM sales team 804, also referred to as business account manager, is responsible for sales and account management for the vendors of the TSM. Some of the team 804 may only work with the SE manufacturers, some may only work with SE Issuers while other may work with more than one type of vendors. The TSM partner service team 806, also referred to as support engineers, is responsible for providing technical support to the vendors of the TSM, such as the SE issuers and the service providers. The TSM partner service team 806, does not deal directly with mobile users but helps partners analyze audit logs. The vendors 808 include one or more of the SE Issuers, the SE manufacturers, and the service providers. An SE issuer holds the responsibilities for the issuance of SEs and owns the ISD of the SEs. Working with the TSM teams, it can install additional SSD for service providers if needed. An SE manufacturer as the name suggests is responsible for manufacturing the SEs and installing a default ISD in the SEs. It also works with the TSM teams to provide these default ISD key sets. The service provider is responsible for developing NFC mobile applications. Exemplary applications from the service providers include, but may not be limited to, transit purses, bank's e-purses and credit cards. Smaller service providers may be those to provide applications used as room keys.

Figure 8B:
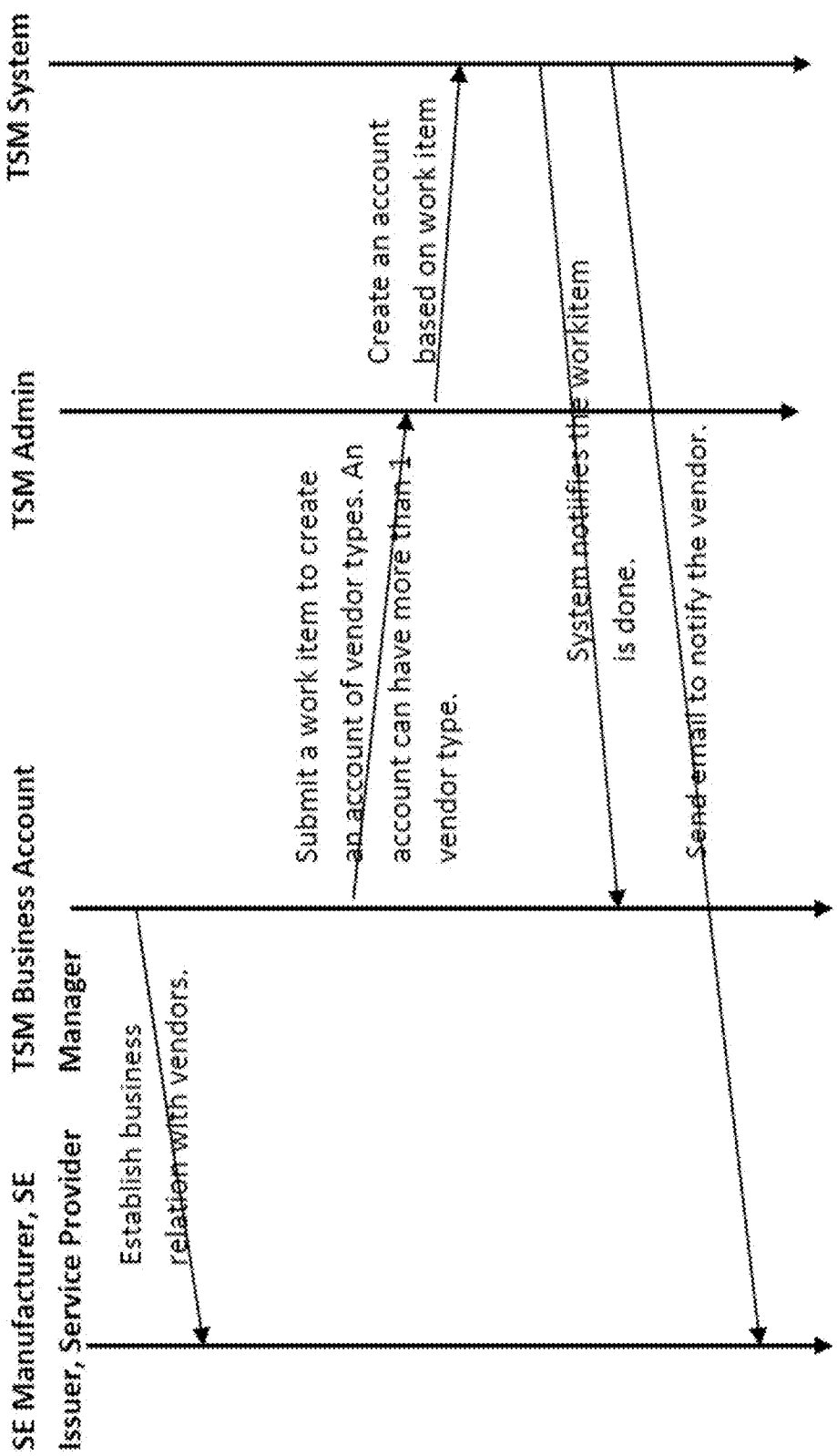
FIG. 8B shows relevant operations among the parties in the TSM according to one embodiment.
Figure 8C:
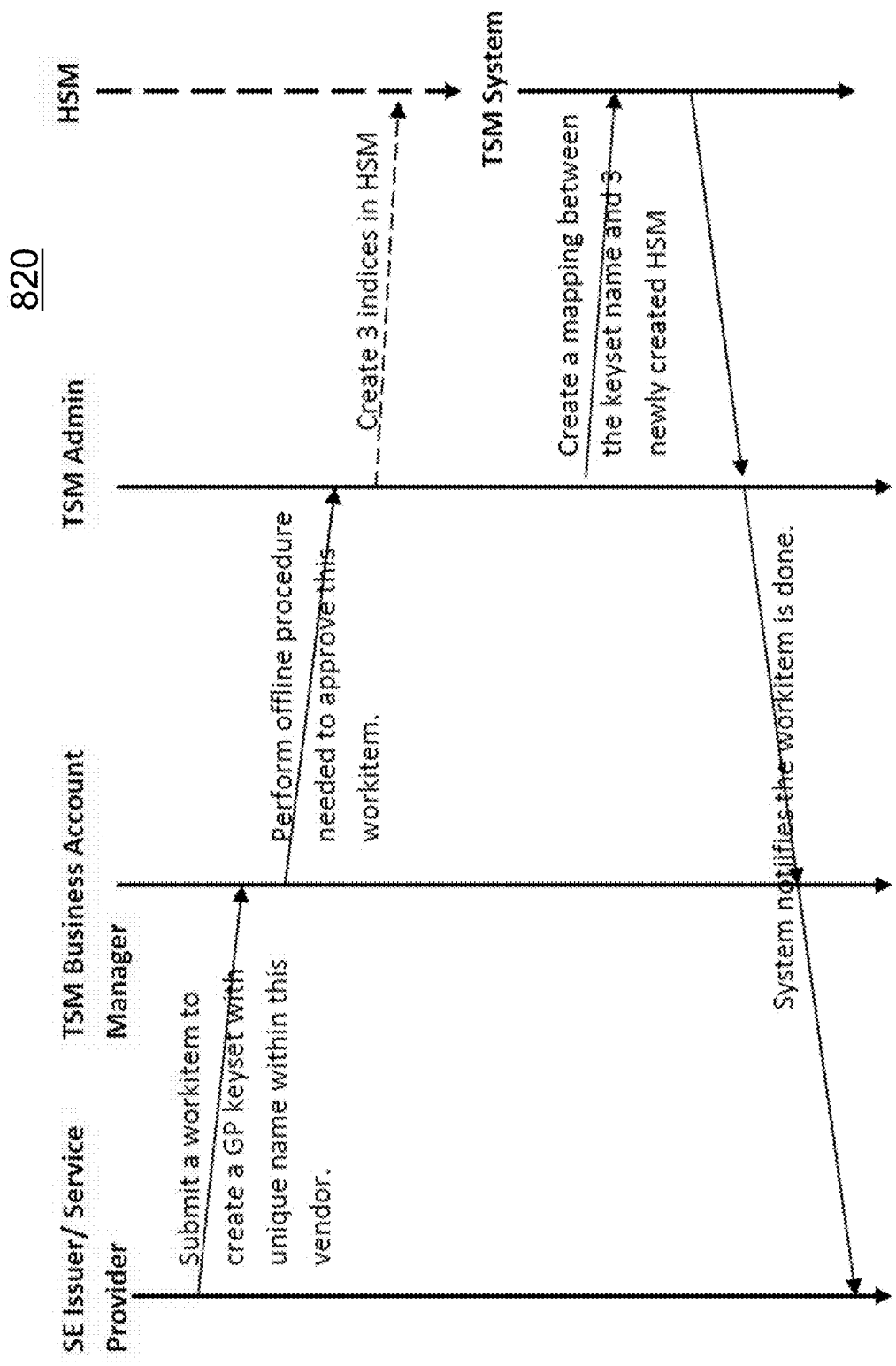
FIG. 8C shows a work flow among multiple parties to establish mutually agreed arrangement in an exemplary TSM.

FIG. 8B shows relevant operations among the parties in the TSM according to one embodiment. The description of the operations is not to be described in detail herein to avoid obscuring the important aspect of the embodiment of the present invention. FIG. 8C shows a work flow among multiple parties to establish mutually agreed arrangement in an exemplary TSM. An SE issuer or a service provider asks the TSM to house its GP keyset. For the SE issuer. In one embodiment, this GP keyset is most likely to be used as ISD. For the service provider, this keyset will be used as SSD. The process of creating the keyset involves creating the keys in the HSM and creates a mapping in TSM system as indicated in FIG. 8C. The effective range of the mapping will be set to a contract expiring date. In general, an HSM key index cannot be active for more than one mapping at the same time.

When the keyset is about to expire, a renewal may be made. The renewal flow is similar to the creation process shown in FIG. 8C. According to one embodiment, the TSM will send a notification to the keyset owner periodically a few months before the keyset expires. The notification stops once the keyset owner renews the contract. The keyset owner can start the renewal process by creating a work request or item. A responsible TSM business account manager approves/rejects the work item. Upon receiving the approved work item, the TSM administration updates the keyset expiring date according to the renewal contract.

Similarly, the keyset can be expired earlier or terminated. The terminate flow is similar to the creation process shown in FIG. 8C. The keyset owner can request to stop the keyset at a future date. The responsible TSM business account manager will verify and approve/reject the request immediately. The TSM administration sets the expiring date of the mapping to the specified date. The HSM key indices can be reused by the TSM for other vendors. An audit log is maintained to keep track of the transactions.

Figure 8D:
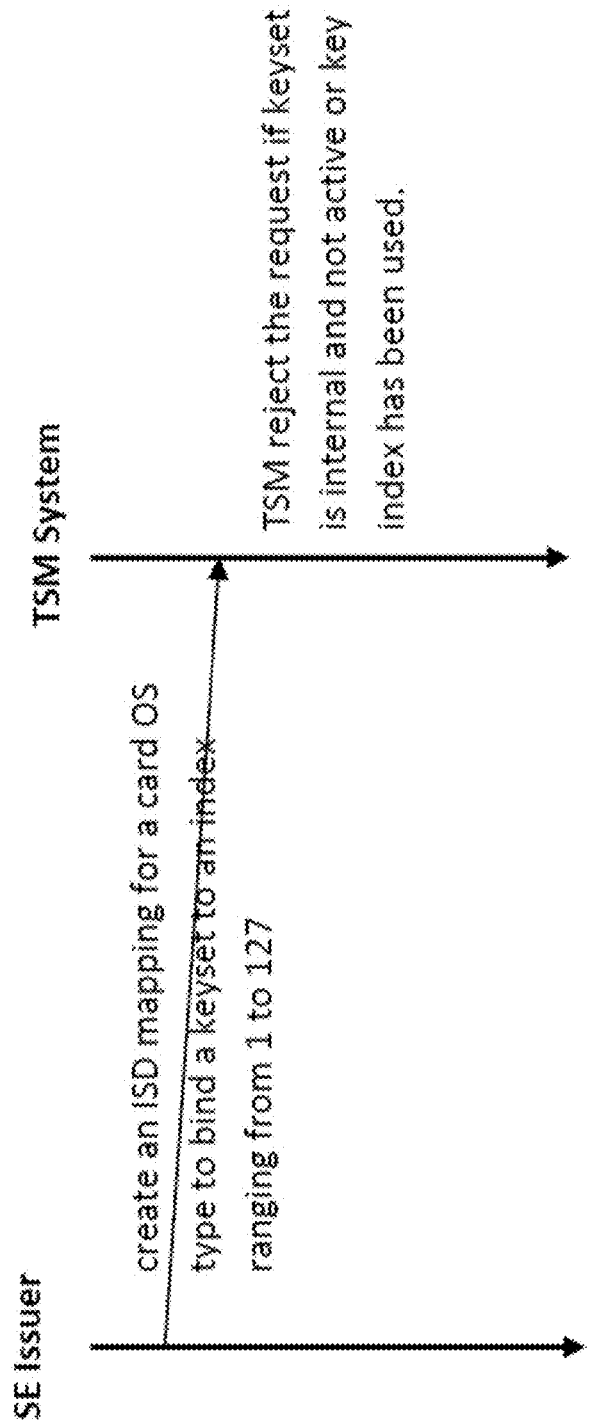
FIG. 8D shows a data flow for an ISD mapping between an SE issuer and a TSM.

FIG. 8D shows a data flow for an ISD mapping between an SE issuer and the TSM. In general, the ISD mappings are managed by each SE Issuer directly. An SE Issuer can create a mapping to bind an external or internal keyset to an ISD key index. External keysets are keysets not residing in an HSM associated with a TSM while the internal keysets are those residing in the HSM. Normally, the SE issuer should not need to specify the default ISD as the default ISD comes from the SE manufacturer. However, an SE Issuer has an option to overwrite this default ISD if needed.

According to FIG. 8D, the SE Issuer creates an ISD mapping for a card OS to bind a keyset and an ISD key index (e.g., ranging from 1 to 127). If the keyset is not external, the TSM will ensure that the keyset mapping with its HSM exists. In operation, the SE issuer can directly modify or delete the ISD mapping. As described above, an SE Manufacturer has the default ISD information for the SEs that it produces. The TSM provides both batch and real-time approaches for the SE manufacturer to share this information. Depending on the agreement with TSM, the manufacturer can use either the batch or real-time approach, which has been described above.

Figure 8E:
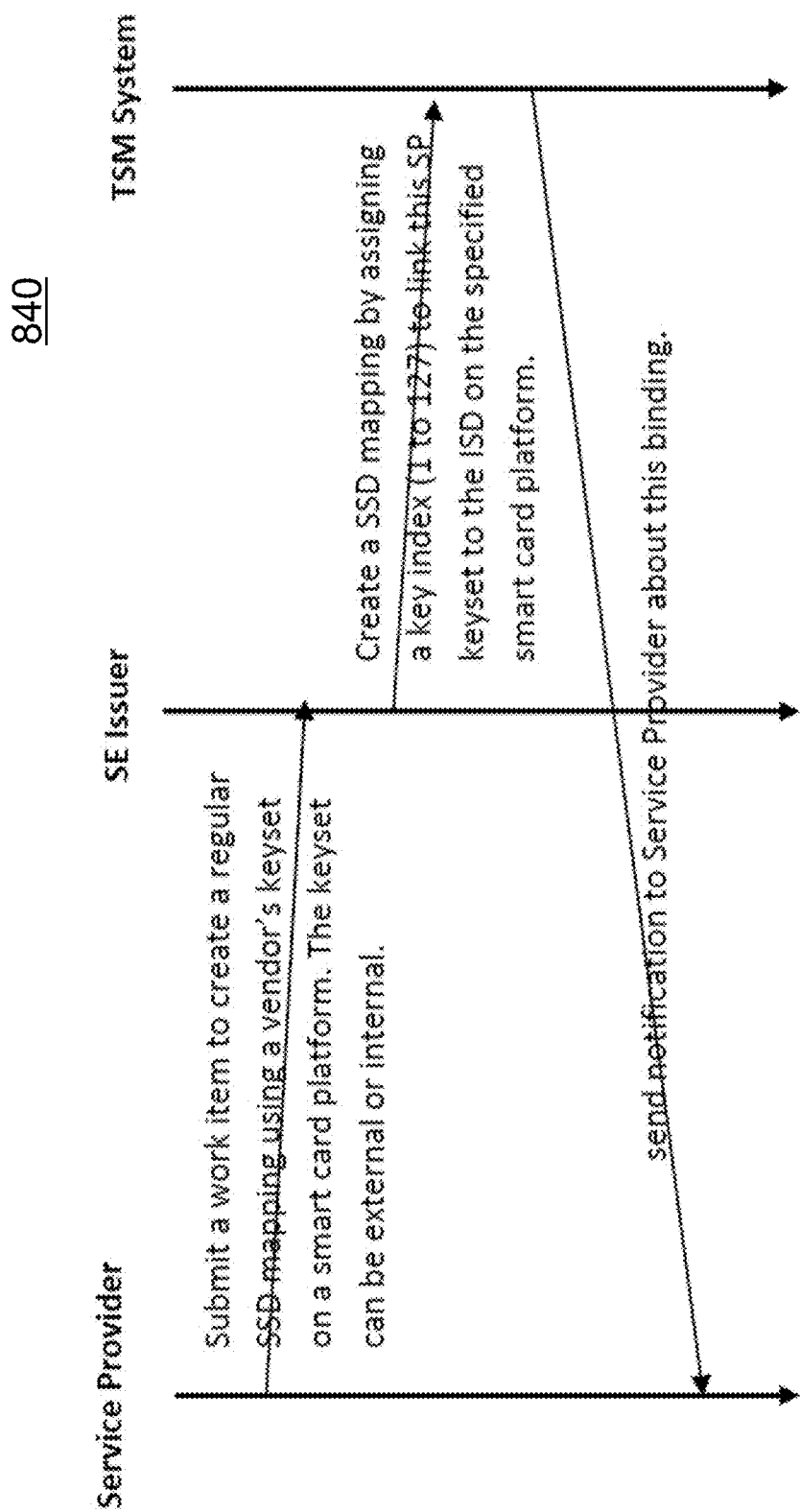
FIG. 8E shows a corresponding data flow among a server provider, an SE issuer and a TSM.

For security reasons, a service provider (SP) may want to have its own SSD for personalizing its applications. The SSD mapping is created by an SE issuer to bind a key index it assigns to the service provider to the SP keyset. FIG. 8E shows a corresponding data flow among a server provider, an SE issuer and the TSM. Similar to the SSD creation, a service provider may request the SE issuer to delete a SSD mapping. The workflow is substantially similar to the SSD creation.

As described above, applications are provided by service providers to the users. An application needs to be approved and published before it is available for mobile users to subscribe and download. For example, a service provider needs to submit an application to SE issuer and TSM for approval. In operation, a service provider needs to submit an application to the SE issuer and TSM for approval. FIG. 8F shows a data flow for the approval of an application by an SE issuer. If a dedicated SSD is needed, the service provider can request a SSD beforehand as described in Section 6, or can indicate in the request. If a dedicated SSD is needed, the service provider can request a SSD beforehand as above or can indicate in the request. Before an approved application is available to general public yet, either the service provider or the SE issuer can initiate the publishing process. Both parties must agree before the application is published in the TSM for the users. Then the vendors are notified of the date and availability of the application.

In some cases, an SE needs to be replaced. The SE replacement could happen at a request of either a mobile user or its SE issuer. Mostly, it is to upgrade a SE for a bigger memory for more services. The following three points should be noted:

- For those applications need to migrate their application states from the old SE, the old SE need to be still accessible by the applications (via TSM).
- For those applications requiring no state migration, the TSM needs simply just reinstall and personalize the applications.
- However, if any applications that have states in the SE but do not support state migration, the TSM is not able to migrate their states. For these applications, they will be treated as the second case (namely, the applications must be reinstalled and personalized).

Figure 8G:
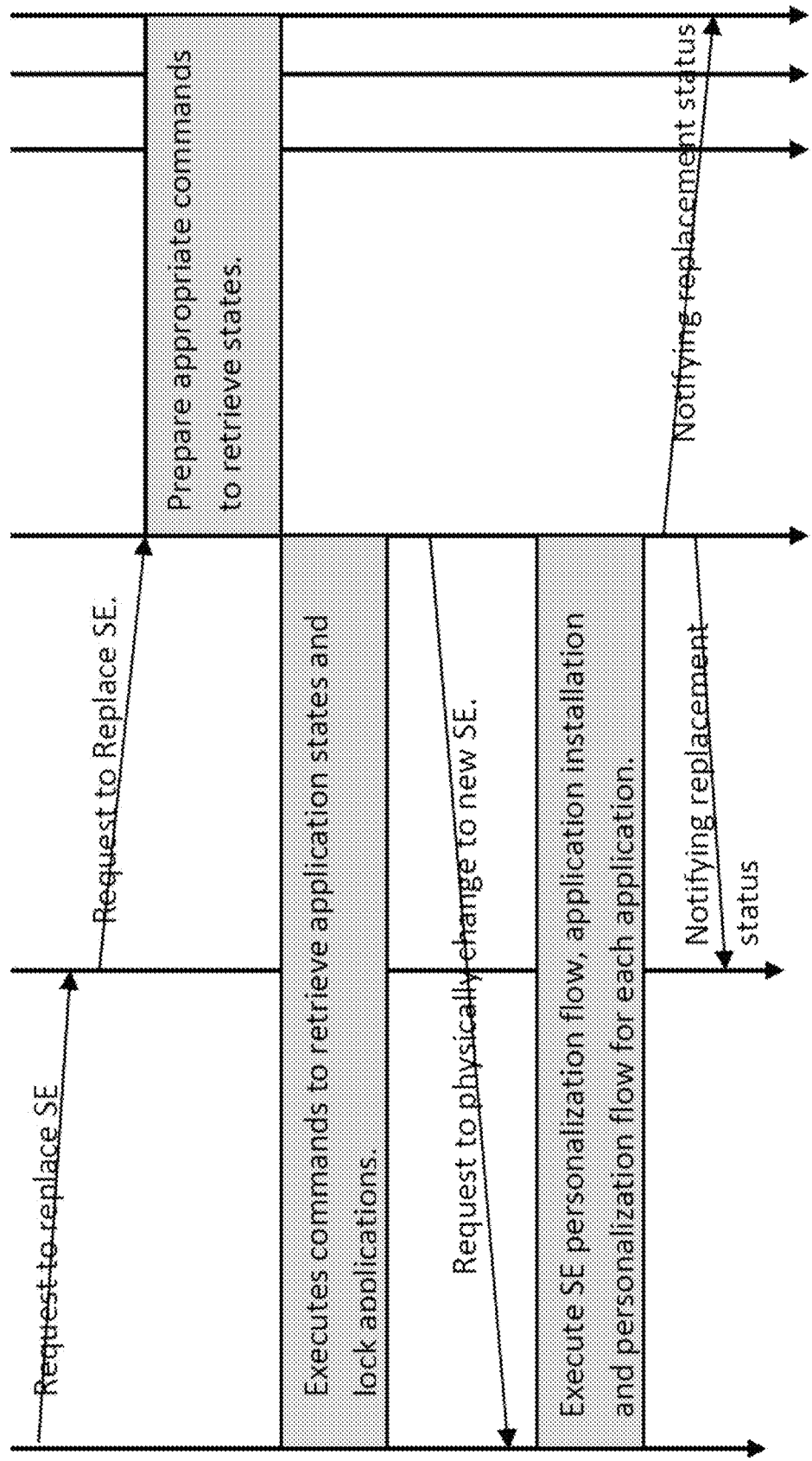
FIG. 8G shows a process of replacing an SE.

FIG. 8G shows a process of replacing an SE and involves the following stages. An SE issuer informs a TSM about SE issuer informs TSM about SE replacement request;
TSM collaborates with service providers to prepare APDU commands for collecting states of applications on the old SE;
For each application, TSM executes the command(s) to retrieve application states and lock the application;
TSM informs mobile user to physically change the new SE. Mobile user may change his/her mind to rollback the replacement request. No rollback is possible after this step;
TSM will update the default ISD if it has not been done; and
Collaborating with Service Providers, TSM will install and personalize or provision each application. If needed, TSM will install the SSD for service providers. The personalization data will be prepared based on the static data in the service provider and the dynamic application states.

Referring now to FIG. 9, it shows a snapshot of a screen display of an account for a personalized SE. As shown in the menu 902, the account maintains detailed information 904 about the SE that has been personalized. In addition, the account includes a list of provisioned applications as well as security keys. Other information such as application owners (who developed the applications), the responsible contact at the TSM, an SE log as well as an applications log may be maintained.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

We claim:

1. A mobile device for emulating a plurality of cards, the mobile device comprising:
a display screen showing a list of a plurality of applications for a user of the mobile device to select one therefrom, each application corresponding to one card in the plurality of cards;
a secure element (SE) including:
an emulator device;
a memory storing a module, when the module is executed by the secure element, the secure element configured to:
receive and install key sets of a Supplementary Secured Domain (SSD);
establish, by the secure element based on the key sets, a secure communication channel with a dedicated server;
receive and install an application from the dedicated server, each application including corresponding application data sets and a locked or unlocked status;
receive, from the plurality of applications, a user selection of a first application corresponding to a first card;
determine that the first application has a locked or unlocked status and is activated,
in response to said determining that the first application has an unlocked status and is activated, load the first application to the emulator device, along with corresponding first application data sets;
receive, from the plurality of applications, a user selection of a second application corresponding to a second card;
determine that the second application has a locked or unlocked status and is activated;
in response to said determining that the second application has an unlocked status and is activated, replace out of the emulator device, a portion of or in entirety, the first application, wherein said replacing out of the emulator device a portion of the first application further comprises retaining the portion of the corresponding first application data sets to be utilized by the second application;

load the second application to the emulator device along with corresponding second application data sets; and increment a counter for each successful application replacement, wherein the mobile device performs functions of the second card when the first application is replaced out of the emulator device and the second application is loaded in the emulator device.

2. The mobile device as recited in claim 1, wherein the secure element is enclosed in the mobile device or in a detachable card to the mobile device.

3. The mobile device as recited in claim 2, wherein each of the applications emulating functions of one of the plurality of cards, performs a function related to a monetary transaction, the mobile device is used to emulate each of the cards when a corresponding application is loaded into and executed in the emulator device.

4. The mobile device as recited in claim 3, wherein at least one of the cards is a contactless card.

5. The mobile device as recited in claim 1, wherein the secure element is preloaded with default Issuer Security Domain (ISD) information and updated subject to retrieved corresponding default ISD information from a party originating the secure element.

6. The mobile device as recited in claim 1, wherein the mobile device is a smartphone or a portable computer.

7. The mobile device as recited in claim 1, wherein each of the applications has been remotely provisioned by a corresponding dedicated server with operations of:

sending a request from the mobile device to the corresponding dedicated server to provision each of the applications installed in the mobile device, wherein the applications are distributed by an application provider;

receiving data for each of the applications being provisioned from the dedicated server, wherein the data includes the SSD to be associated with the each of the applications; and notifying the application provider of a status of each of the applications with the mobile device.

8. A method for a mobile device to emulate a plurality of cards, the method comprising:

displaying a list of a plurality of applications on a display of the mobile device for a user to select one therefrom, each application corresponding to one card in the plurality of cards;

receiving and installing, by a secure element on the mobile device, key sets of a Supplementary Secured Domain (SSD);

establishing, by the secure element and based on the key sets, a secure communication channel with a dedicated server;

receiving and installing, by the secure element, an application from the dedicated sever, each application including corresponding application data sets and a locked or unlocked status, receiving, by the mobile device, a user selection of a first application corresponding to a first card;

determining, by the secure element, that the first application has a locked or unlocked status and is activated;

in response to said determining that the first application has an unlocked status and is activated, loading the first application to an emulator device in the secure element, along with corresponding first application data sets;

receiving, by the mobile device, from the plurality of applications, a user selection of a second application corresponding to a second card;

determining, by the secure element, that the second application has a locked or unlocked status and is activated;

in response to said determining that the second application has an unlocked status and is activated, replacing out of the emulator device, by the secure element, a portion of or in entirety, the first application, wherein said replacing out of the emulator device a portion of the first application further comprises retaining, in the emulator device, the portion of the corresponding first application data sets to be utilized by the second application;

loading the second application to the emulator device along with corresponding second application data sets;

incrementing, by the secure element, a counter for each successful application replacement, wherein the mobile device performs functions of the second card when the first application is replaced out of the emulator device and the second application is loaded in the emulator device.

9. The method as recited in claim 8, wherein the secure element is enclosed in the mobile device or in a detachable card to the mobile device.

10. The method as recited in claim 8, wherein the secure element is preloaded with default Issuer Security Domain (ISD) information that is updatable subject to retrieved corresponding default ISD information from a party originating the secure element.

11. The method as recited in claim 8, wherein the mobile device is a smartphone or a portable computer.

* * * * *